(12) United States Patent
Iagnemma et al.

(10) Patent No.: US 10,829,116 B2
(45) Date of Patent: Nov. 10, 2020

(54) AFFECTING FUNCTIONS OF A VEHICLE BASED ON FUNCTION-RELATED INFORMATION ABOUT ITS ENVIRONMENT

(71) Applicant: nuTonomy Inc., Cambridge, MA (US)

(72) Inventors: Karl Iagnemma, Cambridge, MA (US); Baoxing Qin, Singapore (SG); Philipp Robbel, Cambridge, MA (US)

(73) Assignee: nuTonomy Inc., Boston, MA (US)

( * ) Notice: Subject to any disclaimer, the term of this patent is extended or adjusted under 35 U.S.C. 154(b) by 0 days.

(21) Appl. No.: 15/200,035

(22) Filed: Jul. 1, 2016

(65) Prior Publication Data

US 2018/0004206 A1 Jan. 4, 2018

(51) Int. Cl.
| | |
|---|---|
| *B60W 30/18* | (2012.01) |
| *B60W 10/04* | (2006.01) |
| *B60W 10/18* | (2012.01) |
| *B60W 10/20* | (2006.01) |
| *B60W 50/00* | (2006.01) |

(52) U.S. Cl.
CPC ............ *B60W 30/18* (2013.01); *B60W 10/04* (2013.01); *B60W 10/18* (2013.01); *B60W 10/20* (2013.01); *B60W 50/0098* (2013.01); *B60W 2050/0077* (2013.01); *B60W 2050/0078* (2013.01); *B60W 2552/00* (2020.02); *B60W 2554/00* (2020.02); *B60W 2710/18* (2013.01); *B60W 2710/20* (2013.01); *B60W 2720/10* (2013.01); *B60W 2900/00* (2013.01)

(58) Field of Classification Search
CPC .... G05D 1/0088; B60W 30/18; B60W 10/20; B60W 10/18; B60W 10/04
See application file for complete search history.

(56) References Cited

U.S. PATENT DOCUMENTS

| | | |
|---|---|---|
| 5,166,668 A | 11/1992 | Aoyagi |
| 5,913,917 A | 6/1999 | Murphy |
| 6,018,806 A | 1/2000 | Cortopassi et al. |
| 6,067,501 A | 5/2000 | Vieweg |
| 6,126,327 A | 10/2000 | Bi et al. |
| 6,151,539 A | 11/2000 | Bergholz et al. |
| 6,188,602 B1 | 2/2001 | Alexander et al. |
| 6,320,515 B1 | 11/2001 | Olsson |
| 6,356,961 B1 | 3/2002 | Oprescu-Surcobe |
| 6,546,552 B1 | 4/2003 | Peleg |
| 6,768,813 B1 | 7/2004 | Nakayama |

(Continued)

FOREIGN PATENT DOCUMENTS

| | | |
|---|---|---|
| CN | 105652300 | 6/2016 |
| EP | 2381361 | 10/2011 |

(Continued)

OTHER PUBLICATIONS

Kessels et al., "Electronic Horizon: Energy Management using Telematics Information", Vehicle Power and Propulsion Conference, 2007. VPPC 2007. IEEE, 6 pages.

(Continued)

*Primary Examiner* — Alan D Hutchinson

(74) *Attorney, Agent, or Firm* — Fish & Richardson P.C.

(57) ABSTRACT

Among other things, information is received that identifies or defines a function-related feature of an environment of a vehicle. Function-related information is generated that corresponds to the function-related feature.

28 Claims, 9 Drawing Sheets

Figure 1:
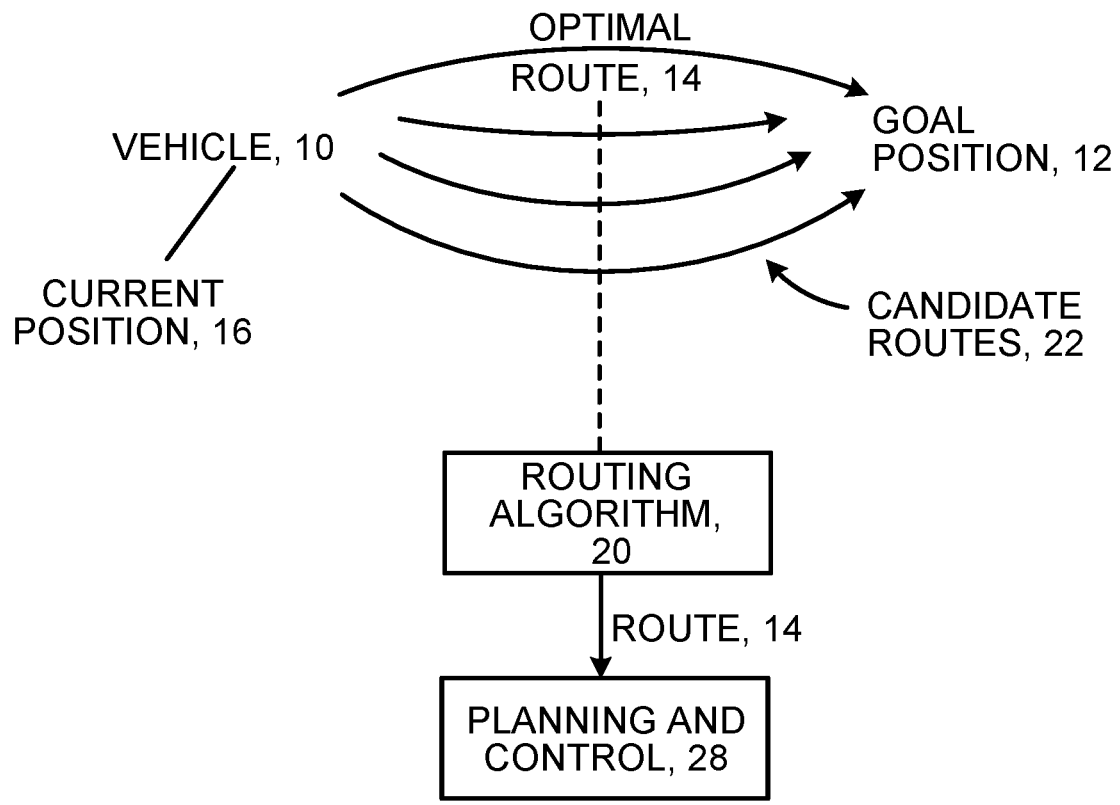

EXEMPLARY SCENARIO WHERE FUNCTION ZONE A IS ASSOCIATED WITH HIGHWAY AND FUNCTION ZONE B IS ASSOCIATED WITH PARKING LOT. A DISTINCT MOTION PLANNING PROCESS MAY BE USED IN EACH FUNCTION ZONE TO YIELD IMPROVED VEHICLE NAVIGATION PERFORMANCE IN THAT ZONE

(56) References Cited

U.S. PATENT DOCUMENTS

| | | |
|---|---|---|
| 6,782,448 B2 | 8/2004 | Goodman et al. |
| 6,836,657 B2 | 12/2004 | Ji et al. |
| 6,947,554 B2 | 9/2005 | Freyman et al. |
| 6,978,198 B2 | 12/2005 | Shi |
| 7,007,049 B2 | 2/2006 | Peng |
| 7,218,212 B2 | 5/2007 | Hu |
| 7,260,465 B2 | 8/2007 | Waldis et al. |
| 7,292,870 B2 | 11/2007 | Heredia et al. |
| 7,350,205 B2 | 3/2008 | Ji |
| 7,512,673 B2 | 3/2009 | Miloushev et al. |
| 7,516,450 B2 | 4/2009 | Ogura |
| 7,562,360 B2 | 7/2009 | Tai et al. |
| 7,584,049 B2 | 9/2009 | Nomura |
| 7,587,433 B2 | 9/2009 | Peleg et al. |
| 7,642,931 B2 | 1/2010 | Sato |
| 7,657,885 B2 | 2/2010 | Anderson |
| 7,665,081 B1 | 2/2010 | Pavlyushchik |
| 7,668,871 B1 | 2/2010 | Cai et al. |
| 7,681,192 B2 | 3/2010 | Dietsch et al. |
| 7,734,387 B1 | 6/2010 | Young et al. |
| 7,802,243 B1 | 9/2010 | Feeser et al. |
| 7,805,720 B2 | 9/2010 | Chang et al. |
| 7,865,890 B2 | 1/2011 | Sumi et al. |
| 7,890,427 B1 | 2/2011 | Rao et al. |
| 7,904,895 B1 | 3/2011 | Cassapakis et al. |
| 7,934,209 B2 | 4/2011 | Zimmer et al. |
| 7,941,656 B2 | 5/2011 | Hans et al. |
| 8,010,959 B2 | 8/2011 | Mullis et al. |
| 8,078,349 B1 | 12/2011 | Prada Gomez et al. |
| 8,095,301 B2 | 1/2012 | Kawamura |
| 8,112,165 B2 | 2/2012 | Meyer et al. |
| 8,146,075 B2 | 3/2012 | Mahajan |
| 8,170,739 B2 | 5/2012 | Lee |
| 8,229,618 B2 | 7/2012 | Tolstedt et al. |
| 8,261,256 B1 | 9/2012 | Adler et al. |
| 8,266,612 B2 | 9/2012 | Rathi et al. |
| 8,271,972 B2 | 9/2012 | Braghiroli |
| 8,326,486 B2 | 12/2012 | Moinzadeh et al. |
| 8,375,108 B2 | 2/2013 | Aderton et al. |
| 8,392,907 B2 | 3/2013 | Oshiumi et al. |
| 8,397,230 B2 | 3/2013 | Ewington et al. |
| 8,428,649 B2 | 4/2013 | Yan et al. |
| 8,429,643 B2 | 4/2013 | Venkatachalam et al. |
| 8,437,890 B2 | 5/2013 | Anderson et al. |
| 8,468,243 B2 | 6/2013 | Ogawa et al. |
| 8,495,618 B1 | 7/2013 | Inbaraj et al. |
| 8,516,142 B2 | 8/2013 | Lee et al. |
| 8,543,261 B2 | 9/2013 | Anderson et al. |
| 8,549,511 B2 | 10/2013 | Seki et al. |
| 8,578,361 B2 | 11/2013 | Cassapakis et al. |
| 8,612,153 B2 | 12/2013 | Nomura et al. |
| 8,612,773 B2 | 12/2013 | Nataraj et al. |
| 8,676,427 B1 | 3/2014 | Ferguson et al. |
| 8,706,394 B2 | 4/2014 | Trepagnier et al. |
| 8,712,624 B1 | 4/2014 | Ferguson et al. |
| 8,744,648 B2 | 6/2014 | Anderson et al. |
| 8,781,715 B2 | 7/2014 | Breed |
| 8,813,061 B2 | 8/2014 | Hoffman et al. |
| 8,880,270 B1 | 11/2014 | Ferguson et al. |
| 9,008,961 B2 | 4/2015 | Nemec et al. |
| 9,045,118 B2 | 6/2015 | Taguchi et al. |
| 9,070,305 B1 | 6/2015 | Raman et al. |
| 9,097,549 B1* | 8/2015 | Rao .................. G01C 21/3461 |
| 9,110,196 B2 | 8/2015 | Urmson et al. |
| 9,120,485 B1 | 9/2015 | Dolgov |
| 9,128,798 B2 | 9/2015 | Hoffman et al. |
| 9,139,199 B2 | 9/2015 | Harvey |
| 9,188,982 B2 | 11/2015 | Thomson |
| 9,202,382 B2 | 12/2015 | Klinger et al. |
| 9,243,537 B1 | 1/2016 | Ge |
| 9,348,577 B2 | 5/2016 | Hoffman et al. |
| 9,349,284 B2* | 5/2016 | Cudak .................. G05D 1/0278 |
| 9,365,213 B2 | 6/2016 | Stenneth et al. |
| 9,399,472 B2 | 7/2016 | Minoiu-Enache |
| 9,412,280 B1 | 8/2016 | Zwillinger et al. |
| 9,465,388 B1 | 10/2016 | Fairfield et al. |
| 9,493,158 B2 | 11/2016 | Harvey |
| 9,519,290 B2 | 12/2016 | Kojo |
| 9,523,984 B1 | 12/2016 | Herbach |
| 9,547,307 B1 | 1/2017 | Cullinane |
| 9,547,986 B1 | 1/2017 | Curlander et al. |
| 9,557,736 B1 | 1/2017 | Silver |
| 9,568,915 B1 | 2/2017 | Berntorp et al. |
| 9,587,952 B1 | 3/2017 | Slusar |
| 9,594,373 B2 | 3/2017 | Solyom et al. |
| 9,600,768 B1 | 3/2017 | Ferguson |
| 9,625,261 B2 | 4/2017 | Polansky |
| 9,645,577 B1* | 5/2017 | Frazzoli ............... G05D 1/0214 |
| 9,648,023 B2 | 5/2017 | Hoffman et al. |
| 9,682,707 B1 | 6/2017 | Silver |
| 9,734,528 B2 | 8/2017 | Gromley |
| 9,841,763 B1 | 12/2017 | Valois |
| 2002/0035422 A1 | 3/2002 | Sasaki |
| 2004/0054995 A1 | 3/2004 | Lee |
| 2004/0093196 A1 | 5/2004 | Hawthorne et al. |
| 2005/0065711 A1 | 3/2005 | Dahlgren et al. |
| 2005/0093720 A1 | 5/2005 | Yamane et al. |
| 2005/0134710 A1 | 6/2005 | Nomura et al. |
| 2006/0103590 A1 | 5/2006 | Divon |
| 2006/0174240 A1 | 8/2006 | Flynn |
| 2006/0217939 A1 | 9/2006 | Nakate et al. |
| 2006/0242206 A1 | 10/2006 | Brezak et al. |
| 2007/0001831 A1 | 1/2007 | Raz et al. |
| 2007/0061074 A1 | 3/2007 | Safoutin |
| 2007/0061779 A1 | 3/2007 | Dowedeit et al. |
| 2007/0124029 A1* | 5/2007 | Hattori ................ B60Q 1/1407 |
| | | 701/1 |
| 2007/0162905 A1 | 7/2007 | Kooijmans |
| 2007/0185624 A1 | 8/2007 | Duddles et al. |
| 2007/0225900 A1 | 9/2007 | Kropp |
| 2007/0226726 A1 | 9/2007 | Robsahm |
| 2007/0229310 A1 | 10/2007 | Sato |
| 2007/0253261 A1 | 11/2007 | Uchida et al. |
| 2007/0255764 A1 | 11/2007 | Sonnier et al. |
| 2008/0001919 A1 | 1/2008 | Pascucci |
| 2008/0005733 A1 | 1/2008 | Ramachandran et al. |
| 2008/0027646 A1 | 1/2008 | Kawabata |
| 2008/0046174 A1 | 2/2008 | Johnson |
| 2008/0119993 A1 | 5/2008 | Breed |
| 2008/0134165 A1 | 6/2008 | Anderson et al. |
| 2008/0140278 A1 | 6/2008 | Breed |
| 2008/0201702 A1 | 8/2008 | Bunn |
| 2008/0244757 A1 | 10/2008 | Nakagaki |
| 2008/0266168 A1 | 10/2008 | Aso et al. |
| 2008/0303696 A1 | 12/2008 | Aso et al. |
| 2009/0024357 A1 | 1/2009 | Aso et al. |
| 2009/0058677 A1 | 3/2009 | Tseng et al. |
| 2009/0089775 A1 | 4/2009 | Zusman |
| 2009/0177502 A1 | 7/2009 | Doinoff et al. |
| 2009/0237263 A1 | 9/2009 | Sawyer |
| 2009/0299630 A1 | 12/2009 | Denaro |
| 2010/0088011 A1 | 4/2010 | Bruce et al. |
| 2010/0228427 A1 | 9/2010 | Anderson et al. |
| 2010/0274430 A1 | 10/2010 | Dolgov et al. |
| 2010/0286824 A1 | 11/2010 | Solomon |
| 2010/0317401 A1 | 12/2010 | Lee et al. |
| 2011/0137549 A1 | 6/2011 | Gupta et al. |
| 2011/0197187 A1 | 8/2011 | Roh |
| 2011/0231095 A1 | 9/2011 | Nakada et al. |
| 2011/0252415 A1 | 10/2011 | Ricci |
| 2011/0265075 A1 | 10/2011 | Lee |
| 2011/0307879 A1 | 12/2011 | Ishida |
| 2012/0017207 A1 | 1/2012 | Mahajan et al. |
| 2012/0083947 A1 | 4/2012 | Anderson |
| 2012/0110296 A1 | 5/2012 | Harata |
| 2012/0124568 A1 | 5/2012 | Fallon et al. |
| 2012/0124571 A1 | 5/2012 | Nagai et al. |
| 2012/0140039 A1 | 6/2012 | Ota |
| 2012/0179362 A1 | 7/2012 | Stille |
| 2012/0242167 A1 | 9/2012 | Zeung et al. |
| 2012/0266156 A1 | 10/2012 | Spivak et al. |
| 2012/0275524 A1 | 11/2012 | Lien et al. |
| 2012/0323402 A1 | 12/2012 | Murakami |
| 2013/0054133 A1 | 2/2013 | Lewis et al. |

(56) References Cited

U.S. PATENT DOCUMENTS

| | | |
|---|---|---|
| 2013/0055231 A1 | 2/2013 | Hyndman et al. |
| 2013/0079950 A1 | 3/2013 | You |
| 2013/0085817 A1 | 4/2013 | Pinkus |
| 2013/0167131 A1 | 6/2013 | Carson |
| 2013/0174050 A1 | 7/2013 | Heinonen et al. |
| 2013/0223686 A1 | 8/2013 | Shimizu |
| 2013/0227538 A1 | 8/2013 | Maruyama |
| 2013/0231824 A1 | 9/2013 | Wilson et al. |
| 2013/0238235 A1 | 9/2013 | Kitchel |
| 2013/0304349 A1 | 11/2013 | Davidson |
| 2013/0328916 A1 | 12/2013 | Arikan et al. |
| 2013/0332918 A1 | 12/2013 | Aoyagi et al. |
| 2013/0338854 A1 | 12/2013 | Yamamoto |
| 2013/0339721 A1 | 12/2013 | Yasuda |
| 2014/0013015 A1 | 1/2014 | Chang |
| 2014/0018994 A1 | 1/2014 | Panzarella et al. |
| 2014/0059534 A1 | 2/2014 | Daum et al. |
| 2014/0067488 A1 | 3/2014 | James et al. |
| 2014/0068594 A1 | 3/2014 | Young et al. |
| 2014/0088855 A1 | 3/2014 | Ferguson |
| 2014/0136414 A1 | 5/2014 | Abhyanker |
| 2014/0149153 A1 | 5/2014 | Cassandras et al. |
| 2014/0156182 A1 | 6/2014 | Nemec et al. |
| 2014/0204209 A1 | 7/2014 | Huth et al. |
| 2014/0245285 A1 | 8/2014 | Krenz |
| 2014/0278090 A1 | 9/2014 | Boes et al. |
| 2014/0303827 A1 | 10/2014 | Dolgov et al. |
| 2014/0309885 A1* | 10/2014 | Ricci ............. H04W 48/04 701/41 |
| 2014/0371987 A1 | 12/2014 | Van Wiemeersch |
| 2015/0012204 A1 | 1/2015 | Breuer et al. |
| 2015/0051785 A1 | 2/2015 | Pal et al. |
| 2015/0081156 A1 | 3/2015 | Trepagnier et al. |
| 2015/0088357 A1 | 3/2015 | Yopp |
| 2015/0120125 A1 | 4/2015 | Thomson et al. |
| 2015/0121071 A1 | 4/2015 | Schwarz |
| 2015/0154243 A1 | 6/2015 | Danaher |
| 2015/0154323 A1 | 6/2015 | Koch |
| 2015/0160024 A1 | 6/2015 | Fowe |
| 2015/0178998 A1 | 6/2015 | Attard et al. |
| 2015/0191135 A1 | 7/2015 | Noon et al. |
| 2015/0191136 A1 | 7/2015 | Noon et al. |
| 2015/0253778 A1 | 9/2015 | Rothoff et al. |
| 2015/0266488 A1 | 9/2015 | Solyom et al. |
| 2015/0279210 A1 | 10/2015 | Zafiroglu et al. |
| 2015/0285644 A1 | 10/2015 | Pfaff et al. |
| 2015/0292894 A1 | 10/2015 | Goddard et al. |
| 2015/0310744 A1 | 10/2015 | Farrelly et al. |
| 2015/0319093 A1 | 11/2015 | Stolfus |
| 2015/0338849 A1 | 11/2015 | Nemec et al. |
| 2015/0339928 A1 | 11/2015 | Ramanujam |
| 2015/0345966 A1 | 12/2015 | Meuleau |
| 2015/0345967 A1 | 12/2015 | Meuleau |
| 2015/0345971 A1 | 12/2015 | Meuleau et al. |
| 2015/0346727 A1 | 12/2015 | Ramanujam |
| 2015/0348112 A1 | 12/2015 | Ramanujam |
| 2015/0353082 A1 | 12/2015 | Lee et al. |
| 2015/0353085 A1 | 12/2015 | Lee et al. |
| 2015/0355641 A1 | 12/2015 | Choi et al. |
| 2015/0358329 A1 | 12/2015 | Noda et al. |
| 2015/0379468 A1 | 12/2015 | Harvey |
| 2016/0013934 A1 | 1/2016 | Smereka et al. |
| 2016/0016127 A1 | 1/2016 | Mentzel et al. |
| 2016/0016525 A1 | 1/2016 | Chauncey et al. |
| 2016/0033964 A1 | 2/2016 | Sato et al. |
| 2016/0041820 A1 | 2/2016 | Ricci et al. |
| 2016/0047657 A1 | 2/2016 | Caylor et al. |
| 2016/0075333 A1 | 3/2016 | Sujan et al. |
| 2016/0107655 A1 | 4/2016 | Desnoyer et al. |
| 2016/0109245 A1 | 4/2016 | Denaro |
| 2016/0129907 A1 | 5/2016 | Kim et al. |
| 2016/0137206 A1 | 5/2016 | Chandraker et al. |
| 2016/0138924 A1 | 5/2016 | An |
| 2016/0139594 A1 | 5/2016 | Okumura et al. |
| 2016/0139598 A1 | 5/2016 | Ichikawa et al. |
| 2016/0139600 A1 | 5/2016 | Delp |
| 2016/0147921 A1 | 5/2016 | VanHolme |
| 2016/0148063 A1 | 5/2016 | Hong et al. |
| 2016/0161266 A1 | 6/2016 | Crawford et al. |
| 2016/0161271 A1 | 6/2016 | Okumura |
| 2016/0167652 A1 | 6/2016 | Slusar |
| 2016/0209843 A1 | 7/2016 | Meuleau et al. |
| 2016/0214608 A1* | 7/2016 | Packwood-Ace ..... B60W 30/14 |
| 2016/0231122 A1 | 8/2016 | Beaurepaire |
| 2016/0239293 A1 | 8/2016 | Hoffman et al. |
| 2016/0266581 A1 | 9/2016 | Dolgov et al. |
| 2016/0282874 A1 | 9/2016 | Kurata et al. |
| 2016/0288788 A1* | 10/2016 | Nagasaka ............ B62D 15/025 |
| 2016/0334229 A1 | 11/2016 | Ross et al. |
| 2016/0334230 A1 | 11/2016 | Ross et al. |
| 2016/0355192 A1 | 12/2016 | James et al. |
| 2016/0370801 A1 | 12/2016 | Fairfield et al. |
| 2016/0379486 A1 | 12/2016 | Taylor |
| 2017/0010613 A1 | 1/2017 | Fukumoto |
| 2017/0016730 A1 | 1/2017 | Gawrilow |
| 2017/0024500 A1 | 1/2017 | Sebastian et al. |
| 2017/0059335 A1 | 3/2017 | Levine et al. |
| 2017/0059339 A1 | 3/2017 | Sugawara et al. |
| 2017/0082453 A1 | 3/2017 | Fischer et al. |
| 2017/0090480 A1 | 3/2017 | Ho et al. |
| 2017/0110022 A1 | 4/2017 | Gulash |
| 2017/0122766 A1 | 5/2017 | Nemec et al. |
| 2017/0139701 A1 | 5/2017 | Lin et al. |
| 2017/0192437 A1 | 7/2017 | Bier et al. |
| 2017/0219371 A1 | 8/2017 | Suzuki et al. |
| 2017/0242436 A1 | 8/2017 | Creusot |
| 2017/0245151 A1 | 8/2017 | Hoffman et al. |
| 2017/0276502 A1 | 9/2017 | Fischer et al. |
| 2017/0277193 A1 | 9/2017 | Frazzoli et al. |
| 2017/0277194 A1 | 9/2017 | Frazzoli et al. |
| 2017/0277195 A1 | 9/2017 | Frazzoli et al. |
| 2017/0291608 A1 | 10/2017 | Engel et al. |
| 2017/0305420 A1 | 10/2017 | Desens et al. |
| 2017/0327128 A1 | 11/2017 | Denaro |
| 2017/0336788 A1 | 11/2017 | Iagnemma |
| 2017/0341652 A1 | 11/2017 | Sugawara et al. |
| 2017/0345321 A1 | 11/2017 | Cross et al. |
| 2017/0356746 A1 | 12/2017 | Iagnemma |
| 2017/0356747 A1 | 12/2017 | Iagnemma |
| 2017/0356748 A1 | 12/2017 | Iagnemma |
| 2017/0356750 A1 | 12/2017 | Iagnemma |
| 2017/0356751 A1 | 12/2017 | Iagnemma |
| 2017/0369051 A1 | 12/2017 | Sakai et al. |
| 2018/0004210 A1 | 1/2018 | Iagnemma et al. |
| 2018/0053276 A1 | 2/2018 | Iagnemma et al. |
| 2018/0053412 A1 | 2/2018 | Iagnemma et al. |
| 2018/0113455 A1 | 4/2018 | Iagnemma et al. |
| 2018/0113456 A1 | 4/2018 | Iagnemma et al. |
| 2018/0113457 A1 | 4/2018 | Iagnemma et al. |
| 2018/0113459 A1 | 4/2018 | Bennie et al. |
| 2018/0113463 A1 | 4/2018 | Iagnemma et al. |
| 2018/0113470 A1 | 4/2018 | Iagnemma et al. |
| 2018/0114442 A1 | 4/2018 | Minemura et al. |
| 2018/0120859 A1 | 5/2018 | Eagelberg et al. |

FOREIGN PATENT DOCUMENTS

| | | |
|---|---|---|
| EP | 2982562 | 2/2016 |
| JP | 2009-102003 | 5/2009 |
| JP | 2018-012478 | 1/2018 |
| WO | WO2014/139821 | 9/2014 |
| WO | WO2015/008032 | 1/2015 |
| WO | WO2015/151055 | 10/2015 |
| WO | WO2017205278 | 11/2017 |
| WO | WO2017/218563 | 12/2017 |
| WO | WO2018/005819 | 1/2018 |

OTHER PUBLICATIONS

Hammerschmidt, "Bosch to Focus on Cloud for Connected Car Services", EE Times Europe. Dec. 3, 2015, 4 pages.

"Gain Scheduling", Wikipedia, 1 page. https://en.wikipedia.org/wiki/Gain_scheduling.

(56) References Cited

OTHER PUBLICATIONS http://www.bosch-presse.de/pressportal/en/connected-horizon----seeing-beyond-the-bends-ahead-35691.html.
Transaction history and application as filed of U.S. Appl. No. 15/182,281, filed Jun. 14, 2016.
Transaction history and application as filed of U.S. Appl. No. 15/200,050, filed Jul. 1, 2016.
Transaction history and application as filed of U.S. Appl. No. 15/182,313, filed Jun. 14, 2016.
Transaction history and application as filed of U.S. Appl. No. 15/182,360, filed Jun. 14, 2016.
Transaction history and application as filed of U.S. Appl. No. 15/182,400, filed Jun. 14, 2016.
Transaction history and application as filed of U.S. Appl. No. 15/182,365, filed Jun. 14, 2016.
U.S. Appl. No. 15/182,281, filed Jun. 14, 2016, Iagnemma.
U.S. Appl. No. 15/200,050, filed Jul. 1, 2016, Iagnemma.
U.S. Appl. No. 15/182,313, filed Jun. 14, 2016, Iagnemma.
U.S. Appl. No. 15/182,360, filed Jun. 14, 2016, Iagnemma.
U.S. Appl. No. 16/186,289, filed Nov. 9, 2018, Iagnemma.
U.S. Appl. No. 15/182,400, filed Jun. 14, 2016, Iagnemma.
U.S. Appl. No. 15/182,365, filed Jun. 14, 2016, Iagnemma.
Dolgov et al. "Path Planning for Autonomous Vehicles in Unknown Semi-structured Environments," International Journal of Robotics Research, 2010, 29(5):485-501.
Florentine et al., "Pedestrian notification methods in autonomous vehicles for multi-class mobility-on-demand service." Proceedings of the Fourth International Conference on Human Agent Interaction, Oct. 4, 2016, pp. 387-392.
Pendleton et al., "Autonomous golf cars for public trial of mobility-on-demand service." Intelligent Robots and Systems (IROS), 2015 IEEE/RSJ International Conference on Sep. 28, 2018, pp. 1164-1171.
International Search Report and Written Opinion in International Application No. PCT/US2017/040040, dated Sep. 15, 2017, 22 pages.
Aguiar et al., "Path-following for non-minimum phase systems removes performance limitations," IEEE Transactions on Automatic Control, 2005, 50(2):234-239.
Aguiar et al., "Trajectory-tracking and path-following of underactuated autonomous vehicles with parametric modeling uncertainty," Transactions on Automatic Control, 2007, 52(8):1362-1379.
Amidi and Thorpe, "Integrated mobile robot control," International Society for Optics and Photonics, Boston, MA, 1991, 504-523.
Aoude et al., "Mobile agent trajectory prediction using Bayesian nonparametric reachability trees," American Institute of Aeronautics and Astronautics, 2011, 1587-1593.
Autoliv.com [online], "Vision Systems—another set of "eyes"," available on or before Sep. 8, 2012, retrieved Oct. 20, 2016,<https://www.autoliv.com/ProductsAndInnovations/ActiveSafetySystems/Pages/VisionSystems.aspx>, 2 pages.
Autonomoustuff.com [online], "ibeo Standard Four Layer Multi-Echo LUX Sensor: Bringing together the World's Best Technologies," available on or before Jul. 2016, retrieved on Feb. 7, 2017, <http://www.autonomoustuff.com/product/ibeo-lux-standard/>, 2 pages.
Bahlmann et al., "A system for traffic sign detection, tracking, and recognition using color, shape, and motion information." IEEE Intelligent Vehicles Symposium, 2005, 255-260.
Balabhadruni, "Intelligent traffic with connected vehicles: intelligent and connected traffic systems," IEEE International Conference on Electrical, Electronics, Signals, Communication, and Optimization, 2015, 2 pages (Abstract Only).
Bertozzi et al., "Stereo inverse perspective mapping: theory and applications" Image and Vision Computing, 1999, 16:585-590.
Betts, "A survey of numerical methods for trajectory optimization," AIAA Journal of Guidance, Control, and Dynamics, Mar.-Apr. 1998, 21(2):193-207.
Castro et al., "Incremental Sampling-based Algorithm for Minimum-violation Motion Planning", Decision and Control, IEEE 52nd Annual Conference, Dec. 2013, 3217-3224.
Chaudari et al., "Incremental Minimum-Violation Control Synthesis for Robots Interacting with External Agents," American Control Conference, Jun. 2014, <http://vision.ucla.edu/~pratikac/pub/chaudhari.wongpiromsarn.ea.acc14.pdf>, 1761-1768.
Chen et al., "Likelihood-Field-Model-Based Dynamic Vehicle Detection and Tracking for Self-Driving," IEEE Transactions on Intelligent Transportation Systems, Nov. 2016, 17(11):3142-3158.
D'Andrea-Novel et al., "Control of Nonholonomic Wheeled Mobile Robots by State Feedback Linearization," The International Journal of Robotics Research, Dec. 1995, 14(6):543-559.
De la Escalera et al., "Road traffic sign detection and classification," IEEE Transactions on Industrial Electronics, Dec. 1997, 44(6):848-859.
Delphi.com [online], "Delphi Electronically Scanning Radar: Safety Electronics," retrieved on Feb. 7, 2017, <http://delphi.com/manufacturers/auto/safety/active/electronically-scanning-radar>, 4 pages.
Demiris, "Prediction of intent in robotics and multi-agent systems." Cognitive Processing, 2007, 8(3):151-158.
Dominguez et al., "An optimization technique for positioning multiple maps for self-driving car's autonomous navigation," IEEEE International Conference on Intelligent Transportation Systems, 2015, 2694-2699.
Fairfield and Urmson, "Traffic light mapping and detection," In Proceedings of the International Conference on Robotics and Automation (ICRA), 2011, 6 pages.
Falcone et al., "A linear time varying model predictive control approach to the integrated vehicle dynamics control problem in autonomous systems," IEEE Conference on Decision and Control, 2007, 2980-2985.
Falcone et al., "A Model Predictive Control Approach for Combined Braking and Steering in Autonomous Vehicles", Ford Research Laboratories, Mediterranean Conference on Control & Automation, 2007, <http;//www.me.berkeley.edu/~frborrel/pdf/pub/pub-20.pdf>, 6 pages.
Fong et al., "Advanced Interfaces for Vehicle Teleoperation: Collaborative Control Sensor Fusion Displays, and Remote Driving Tools", Autonomous Robots 11, 2001, 77-85.
Franke et al., "Autonomous driving goes downtown," IEEE Intelligent Systems and their Applications, 1998, 6:40-48.
Fraser, "Differential Synchronization," ACM: DocEng '09, Sep. 2009, <https://static.googleusercontent.com/media/research.google.com/en//pubs/archive/35605.pdf>, 13-20.
Garcia et al., "Model predictive control: theory and practice—a survey," Automatica, 1989, 25(3):335-348.
Gavrila and Philomin, "Real-time object detection for "smart" vehicles," In Proceedings of the Seventh IEEE International Conference on Computer Vision, 1999, 1:87-93.
Golovinsky et al., "Shape-based Recognition of 3D Point Clouds in Urban Environments," Proceedings of the 12th International Conference on Computer Vision, 2009, 2154-2161.
He et al., "Color-Based Road Detection in Urban Traffic Scenes," IEEE Transactions on Intelligent Transportation Systems, Dec. 2004, 5(4):309-318.
Himmelsback et al., "Fast Segmentation of 3D Point Clouds for Ground Vehicles," IEEE Intelligent Vehicles Symposium, Jul. 21-24, 2010, 6 pages.
IEEE Global Initiative for Ethical Consideration in Artificial Intelligence and Autonomous Systems, "Ethically Aligned Design: A Vision for Prioritizing Human Wellbeing with Artificial Intelligence and Autonomous Systems," IEEE Advancing Technology for Humanity, Dec. 13, 2016, 138 pages.
ISO.org, "ISO 14229-1:2006; Road Vehicles—Unified diagnostic services (UDS)—Part 1: Specification and requirements," International Standard Organization, 2006, retrieved on Apr. 4, 2018, <https://www.iso.org/standard/45293.html>, 2 pages (abstract).
ISO.org, "ISO 15765-3:2004; Road Vehicles—Diagnostics on Controller Area Networks (CAN)—Part 3: Implementation of unified diagnostic services (UDS on CAN)," International Standard Organization, Oct. 2004, retrieved on Apr. 4, 2018, <https://www.iso.org/obp/ui/#iso:std:iso:14229:-1:ed-1:v2:en>, 2 pages (abstract).
Jiang and Nijmeijer, "Tracking control of mobile robots: a case study in backstepping," Automatica, 1997, 33(7):1393-1399.

(56) References Cited

OTHER PUBLICATIONS

Kanayama, "A Stable Tracking Control Method for an Autonomous Mobile Robot," International Conference on Robotics and Automation, 1990, 384-389.
Karaman and Frazzoli, "Sampling-based algorithms for optimal motion planning." Int. Journal of Robotics Research, Jun. 2011, <http://ares.lids.mit.edu/papers/Kamman.Frazzoli.IJRR11.pdf>, 30(7):846-894.
Karaman et al., "Sampling-based Algorithms for Optimal Motion Planning with Deterministic—Calculus Specifications", 2012 American Control Conference, Jun. 27-Jun. 29, 2012, 8 pages.
Kavraki et al., "Probabilistic roadmaps for path planning in high-dimensional configuration spaces." IEEE Transactions on Robotics and Automation, 1996, 12(4):566-580.
Kim, "Robust lane detection and tracking in challenging scenarios." IEEE Transactions on Intelligent Transportation Systems, 2008, 9(1):16-26.
Larson et al., "Securing Vehicles against Cyber Attacks," ACM, 2008, retrieved on [date], <http://dl.acm.org/citation.cfm?id=1413174>, 3 pages.
Lindner et al., "Robust recognition of traffic signals," IEEE Intelligent Vehicles Symposium, 2004, 5 pages.
Liu et al, "Nonlinear Stochastic Predictive Control with Unscented Transformation for Semi_ Autonomous Vehicles," American Control Conference, Jun. 4-6, 2014, 5574-5579.
Liu et al., "Robust semi-autonomous vehicle control for roadway departure and obstacle avoidance," ICCAS, Oct. 20-23, 2013, 794-799.
Lobdell, "Robust Over-the-air Firmware Updates Using Program Flash Memory Swap on Kinetis Microcontrollers," Freescal Semiconductor Inc., 2012, retrieved on Apr. 11, 2018, <http://cache.freescale.com/flies/microcontrollers/doc/app_note/AN4533.pdf>, 20 pages.
Luzcando (searcher), "EIC 3600 Search Report," STIC—Scientific & Technical Information Center, Feb. 14, 2018, 20 pages.
Maldonado-Bascón et al., "Road-sign detection and recognition based on support vector machines," IEEE Transactions on Intelligent Transportation Systems, 2007, 8(2):264-278.
Mayne et al., "Constrained model predictive control: Stability and optimality," Automatica, 2000, 36(6):789-814.
Mobileye [online], "Advanced Driver Assistance Systems (ADAS) systems range on the spectrum of passive/active," Copyright 2017, retrieved on Oct. 20, 2016, <http://www.mobileye.com/our-technology/adas/>, 2 pages.
Mogelmose et al., "Vision-based traffic sign detection and analysis for intelligent driver assistance systems: Perspectives and survey," IEEE Transactions on Intelligent Transportation Systems, 2012, 13(4):1484-1497.
Morris et al., "Learning, modeling, and classification of vehicle track patterns from live video." IEEE Transactions on Intelligent Transportation Systems, 2008, 9(3):425-437.
Nilsson et al., "A Framework for Self-Verification of Firmware Updates over the Air in Vehicle ECUs," IEEE. GLOBECOM Workshops, Nov. 2008, 5 pages.
Nilsson et al., "Conducting Forensic Investigations of Cyber Attacks on Automobiles In-Vehicle Networks," ICST, 2008, retrieved on Mar. 20, 2016, <http://dl.acm.org/citation.cfm?id=1363228>, 6 pages.
Ollero and Amidi, "Predictive path tracking of mobile robots. application to the CMU Navlab," in 5th International Conference on Advanced Robotics, 1991, 91:1081-1086.
Paik et al., "Profiling-based Log Block Replacement Scheme in FTL for Update-intensive Executions," IEEE: Embedded and Ubiquitous Computing (EUC), Oct. 2011, 182-188.
Ponomarev, "Augmented reality's future isn't glasses. It's the car," Venturebeat.com, available on or before, Aug. 2017, retrieved on Mar. 30, 2018, <https://venturebeat.com/2017/08/23/ar-will-drive-the-evolution-of-automated-cars/>, 4 pages.

Premebida et al., "A lidar and vision-based approach for pedestrian and vehicle detection and tracking." In Proceedings of the IEEE Intelligent Transportation Systems Conference, 2007, 1044-1049.
Premebida et al., "LIDAR and vision-based pedestrian detection system." Journal of Field Robotics, 2009, 26(9):696-711.
Rankin et al., "Autonomous path planning navigation system used for site characterization," SPIE—International Society for Optics and Photonics, 1996, 176-186.
Shavel-Shwartz et al., "Avoiding a "Winter of Autonomous Driving": On a Formal Model of Safe, Scalable, Self-driving Cars," arXiv preprint, Aug. 17, 2017, 25 pages.
Shen et al., "A Robust Video based Traffic Light Detection Algorithm for Intelligent Vehicles," Proceedings of the IEEE Intelligent Vehicles Symposium, 2009, 521-526.
Shin, "Hot/Cold Clustering for Page Mapping in NAND Flash Memory," IEEE: Transactions on Consumer Electronics, Nov. 2011, 57(4):1728-1731.
Spieser et al, "Toward a systematic approach to the design and evaluation of automated mobility-on-demand systems: A case study in Singapore," Road Vehicle Automation, 2014, 229-245.
Standards.sae.org, "Taxonomy and Definitions for Terms Related to Driving Automation Systems for On-Road Motor Vehicles," SAE International, Sep. 2016, retrieved on Apr. 18, 2017, <http://standards.sae.org/j3016_201609/>, 3 pages.
Steger et al, "Applicability of IEEE 802.11s for Automotive Wireless Software Updates," IEEE: Telecommunications (ConTEL), Jul. 2015, 8 pages.
Stokar, "Perform over-the-air updates for car ECUss," eMedia Asia Ltd., 2013, retrieved on Apr. 11, 2018, <http://www.eetasia.com/STATIC/PDF/201312/EEOL_2013DEC05_NET_EMS_TA_01.pdf?SOURCES=DOWNLOAD>, 3 pages.
Strahn et al., "Laser Scanner-Based Navigation for Commercial Vehicles," IEEE Intelligent Vehicles Symposium, Jun. 13-15, 2007, 969-974.
Tabuada and Pappas, "Linear time logic control of discrete-time linear systems," IEEE Transactions on Automatic Control, 2006, 51(12):1862-1877.
Wallace et al., "First results in robot road-following," in IJCAI, 1985, 1089-1095.
Wang et al., "Lane detection and tracking using B-Snake," Image and Vision Computing, 2004, 22(4):269-280.
Wang et al., "Simultaneous localization, mapping and moving object tracking," The International Journal of Robotics Research, 2007, 26(9):889-916.
Weiskircher et al., "Predictive Guidance and Control Framework for (Semi-) Autonomous Vehicles in Public Traffic," IEEE Transactions on Control Systems Technology, 2017, 25(6):2034-2046.
Weiss et al., "Autonomous v. Tele-operated: How People Perceive Human-Robot Collaboration with HRP-2," Proceedings of the 4th ACM/IEEE international conference on Human robot interaction, 2009, 3 pages.
Wit et al., "Autonomous ground vehicle path tracking," Journal of Robotic Systems, 2004, 21(8):439-449.
Wu et al., "Data Sorting in Flash Memory," ACM, 2015, <http://dl.acm.org/citation.cfm?id=2747982.2665067>, 25 pages.
Yilmaz et al., "Object tracking: A survey," ACM Computing Surveys, 2006, 31 pages.
Zax, "A Software Update for Your Car? Ford reboots it infotainment system, following consumer complaints," MIT Technology Review, 2012, retrieved on Apr. 11, 2018, <http://www.technologyreview.com/view/427153/a-software-update-for-yourcar?/>, 6 pages.
Zheng et al, "Lane-level positioning system based on RFID and vision," IET International Conference on Intelligent and Connected Vehicles, 2016, 5 pages.
International Preliminary Report on Patentability in International Application No. PCT/US2017/040040, dated Jan. 10, 2019, 7 pages.
EP Extended Search Report in European Application No. 17821263, dated Jun. 25, 2019, 8 pages.

\* cited by examiner

EXEMPLARY SCENARIO WHERE FUNCTION ZONE A IS ASSOCIATED WITH AREA SURROUNDING CROSSWALK. PROPERTIES OF PERCEPTION PROCESSES MAY BE ADJUSTED IN FUNCTION ZONE TO IMPROVE DETECTION OF PEDESTRIANS IN THAT ZONE.

AFFECTING FUNCTIONS OF A VEHICLE BASED ON FUNCTION-RELATED INFORMATION ABOUT ITS ENVIRONMENT

This description relates to affecting functions of a vehicle based on function-related characteristics of its environment.

An autonomous vehicle can drive safely without human intervention during part of a journey or an entire journey.

An autonomous vehicle includes sensors, actuators, computers, and communication devices to enable automated generation and following of routes through the environment. Some autonomous vehicles have wireless two-way communication capability to communicate with remotely-located command centers that may be manned by human monitors, to access data and information stored in a cloud service and to communicate with emergency services.

As shown in FIG. 1, in a typical use of an autonomous vehicle 10, a desired goal position 12 (e.g., a destination address or street intersection) may be identified in a variety of ways. The goal position may be specified by a rider (who may be, for example, an owner of the vehicle or a passenger in a mobility-as-a-service "robo-taxi" application). The goal position may be provided by an algorithm (which, for example, may be running on a centralized server in the cloud and tasked with optimizing the locations of a fleet of autonomous vehicles with a goal of minimizing rider wait times when hailing a robo-taxi). In some cases, the goal position may be provided by a process (e.g., an emergency process that identifies the nearest hospital as the goal position due to a detected medical emergency on board the vehicle).

Given a desired goal position, a routing algorithm 20 determines a route 14 through the environment from the vehicle's current position 16 to the goal position 12. We sometimes call this process "route planning." In some implementations, a route is a series of connected segments of roads, streets, and highways (which we sometimes refer to as road segments or simply segments).

Routing algorithms typically operate by analyzing road network information. Road network information typically is a digital representation of the structure, type, connectivity, and other relevant information about the road network. A road network is typically represented as a series of connected road segments. The road network information, in addition to identifying connectivity between road segments, may contain additional information about the physical and conceptual properties of each road segment, including but not limited to the geographic location, road name or number, road length and width, speed limit, direction of travel, lane edge boundary type, and any special information about a road segment such as whether it is a bus lane, whether it is a right-turn only or left-turn only lane, whether it is part of a highway, minor road, or dirt road, whether the road segment allows parking or standing, and other properties.

The routing algorithm typically identifies one or more candidate routes 22 from the current position to the goal position. Identification of the best, or optimal, route 14 from among the candidate routes is generally accomplished by employing algorithms (such as A*, D*, Dijkstra's algorithm, and others) that identify a route that minimizes a specified cost. This cost is typically a function of one or more criteria, often including the distance traveled along a candidate route, the expected time to travel along the candidate route when considering speed limits, traffic conditions, and other factors. The routing algorithm may identify one or more than one good routes to be presented to the rider (or other person, for example, an operator at a remote location) for selection or approval. In some cases, the one optimal route may simply be provided to a vehicle trajectory planning and control module 28, which has the function of guiding the vehicle toward the goal (we sometimes refer to the goal position simply as the goal) along the optimal route.

Figure 2:
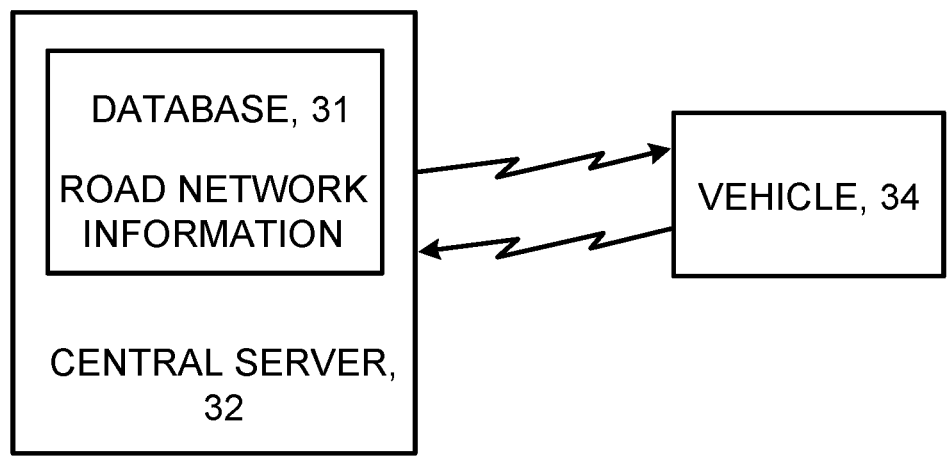

As shown in FIG. 2, road network information 31 typically is stored in a database 30 that is maintained on a centrally accessible server 32 and may be updated at high frequency (e.g., 1 Hz or more). The network information can be accessed either on-demand (e.g., requested by the vehicle 34), or pushed to the vehicle by the server.

Road network information can have temporal information associated with it, to enable descriptions of traffic rules, parking rules, or other effects that are time dependent (e.g., a road segment that does not allow parking during standard business hours, or on weekends, for example), or to include information about expected travel time along a road segment at specific times of day (e.g., during rush hour).

SUMMARY

In general, in an aspect, information is received about a function-related feature of an environment of a vehicle that has been identified in connection with a location of the vehicle.

Execution of a function of the vehicle is affected to alter performance characteristics of the function based on the identified function-related feature.

Implementations may include one or a combination of two or more of the following features. The function-related feature includes a geographic region. The function-related feature includes a road feature. The function includes a software process. The function includes motion planning. The function includes trajectory tracking. The function includes actuator control. The function includes decision-making. The function includes perception processing. The function includes localization of the vehicle. The function includes sensor data recording on-board the vehicle. The execution of the function is affected by switching from one function to another function. The execution of the function is affected by altering an operation of a function. The affecting of the execution of the function is based on parameter settings. The parameter settings are selected from among two or more different sets of parameter settings. The affecting of the execution of the function is based on prior information. The prior information includes a simulation model. The prior information includes two or more simulation models. The information about the function-related feature is received from a database.

In general, in an aspect, information is received that identifies or defines a function-related feature of an environment of a vehicle. Function-related information is generated that corresponds to the function-related feature.

Implementations may include one or a combination of two or more of the following features. The information is received from an automated process. The information is received from a user interacting with a user interface. The information is received from a combination of an automated process and a user interacting with a user interface. The function-related information includes a location that corresponds to the function-related feature. The function-related feature includes a geographic region that corresponds to the function-related feature. The function-related feature includes a road feature. The information is received while the vehicle is traveling in the vicinity of the function-related feature. The generated function-related information is stored in a database. The database includes a road network information database that includes information about road segments. The function-related information is fed through a communication network to a location where a road network information is accumulated.

These and other aspects, features, implementations, and advantages, and combinations of them, can be expressed as methods, systems, components, apparatus, program products, methods of doing business, means and steps for performing functions, and in other ways.

Other aspects, features, implementations, and advantages will become apparent from the following description and from the claims.

DESCRIPTION

Figure 3:
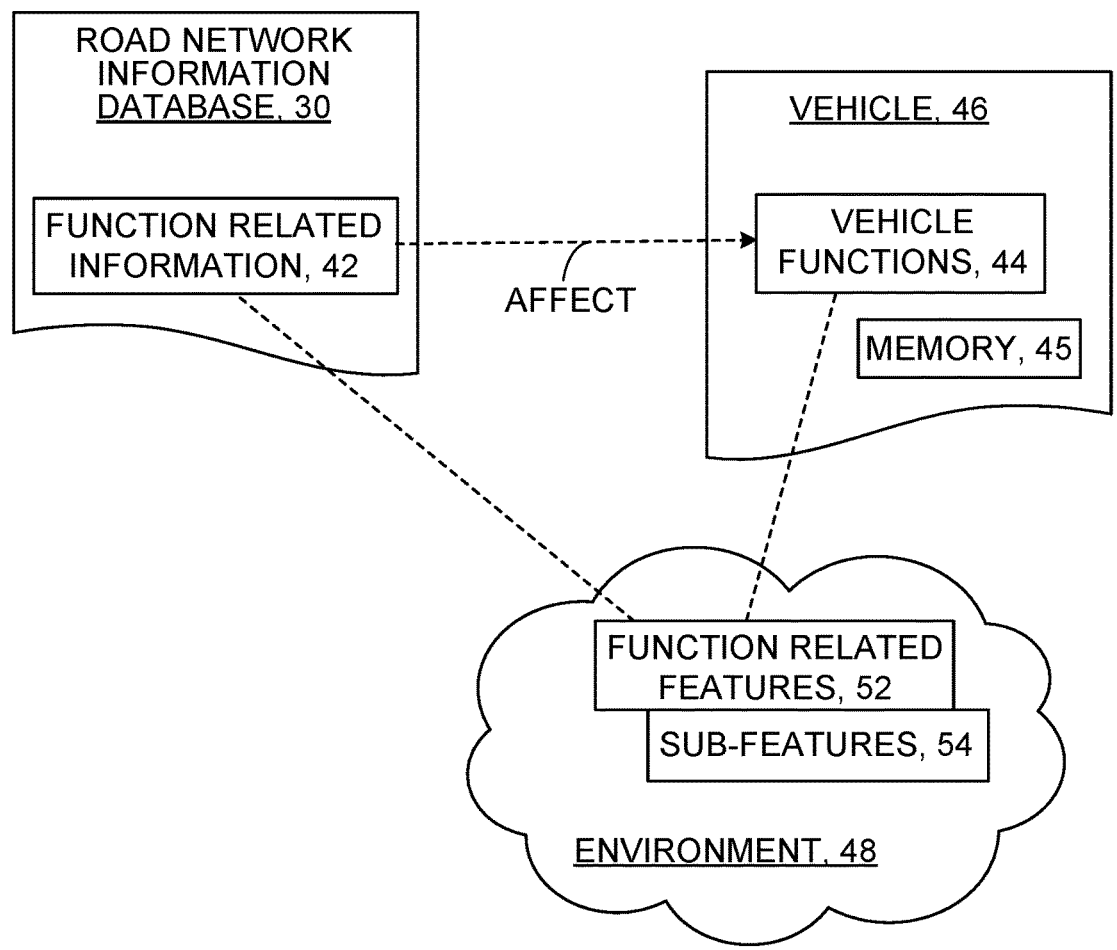

FIGS. 1 through 5 are block diagrams.
FIGS. 6 through 9 show scenarios.
As shown in FIG. 3, in some implementations of the techniques and systems that we describe here, a road network information database 30 stores not only information about the nature of the road segments of the road network, but also information 42 about features of the environment 48 that relate to functions 44 of a vehicle 46 (for example, an autonomous vehicle). In some cases, the functions of the vehicle are functions performed by software processes.

We sometimes refer to this information broadly as "function-related information" and to the functions of the vehicle broadly as "vehicle functions." Such function-related information may be used not only to select a route but also to manage, control, influence, inform, or otherwise (in broad terms) "affect" the functions and performance of a vehicle. In some implementations, the function-related information is used to affect the vehicle functions by modifying the type, structure, or performance (or a combination of them) of software processes on the vehicle.

We here introduce the term "function-related features" 52 which we use broadly to include, for example, any location or geographic region or other features of the environment of a vehicle that can be related to one or more vehicle functions. The identity or location or boundary or other identification information for a function-related feature 52 is part of the function-related information that is stored in a road network information database or similar database.

Figure 4A:
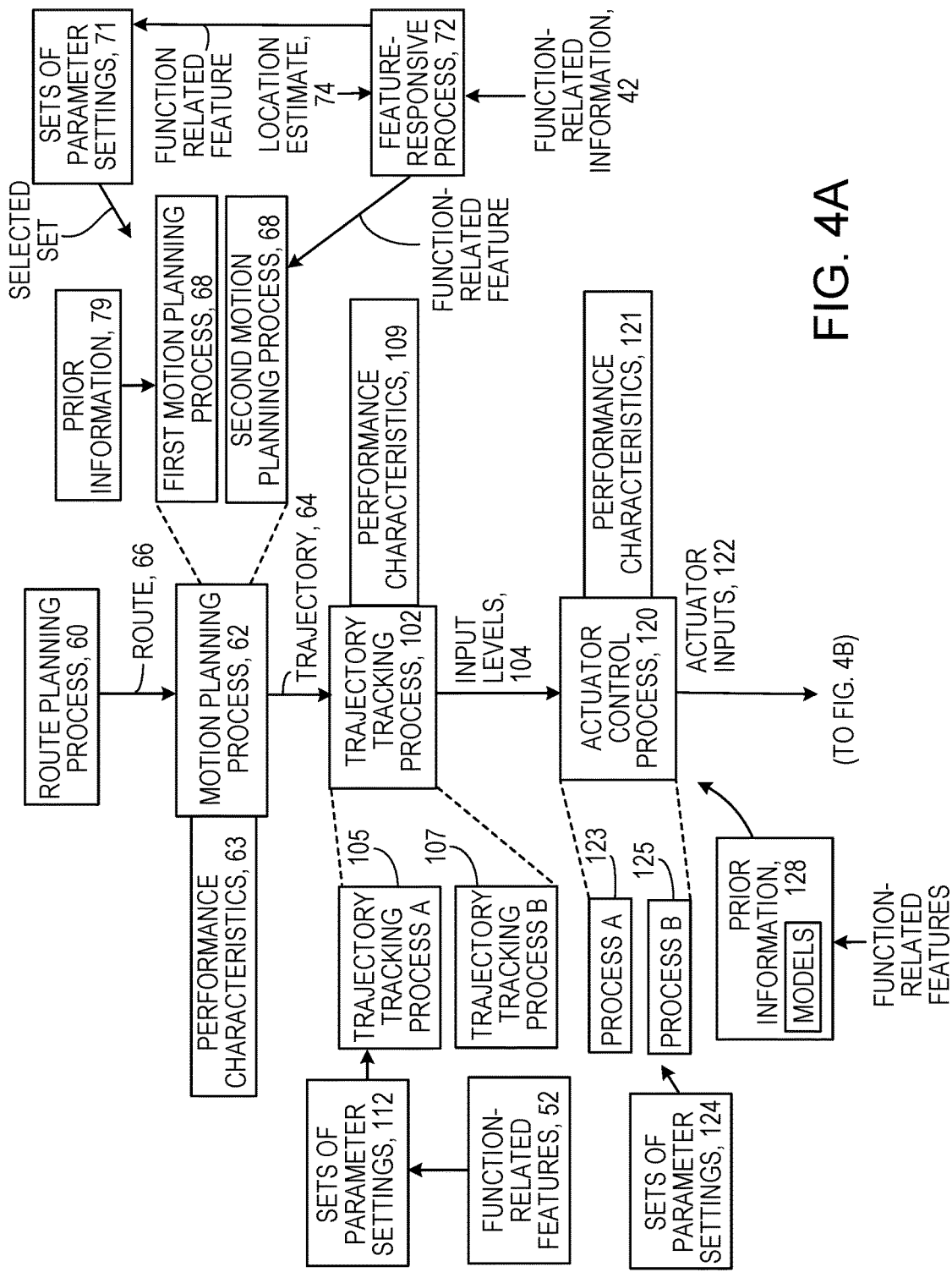
Figure 4B:
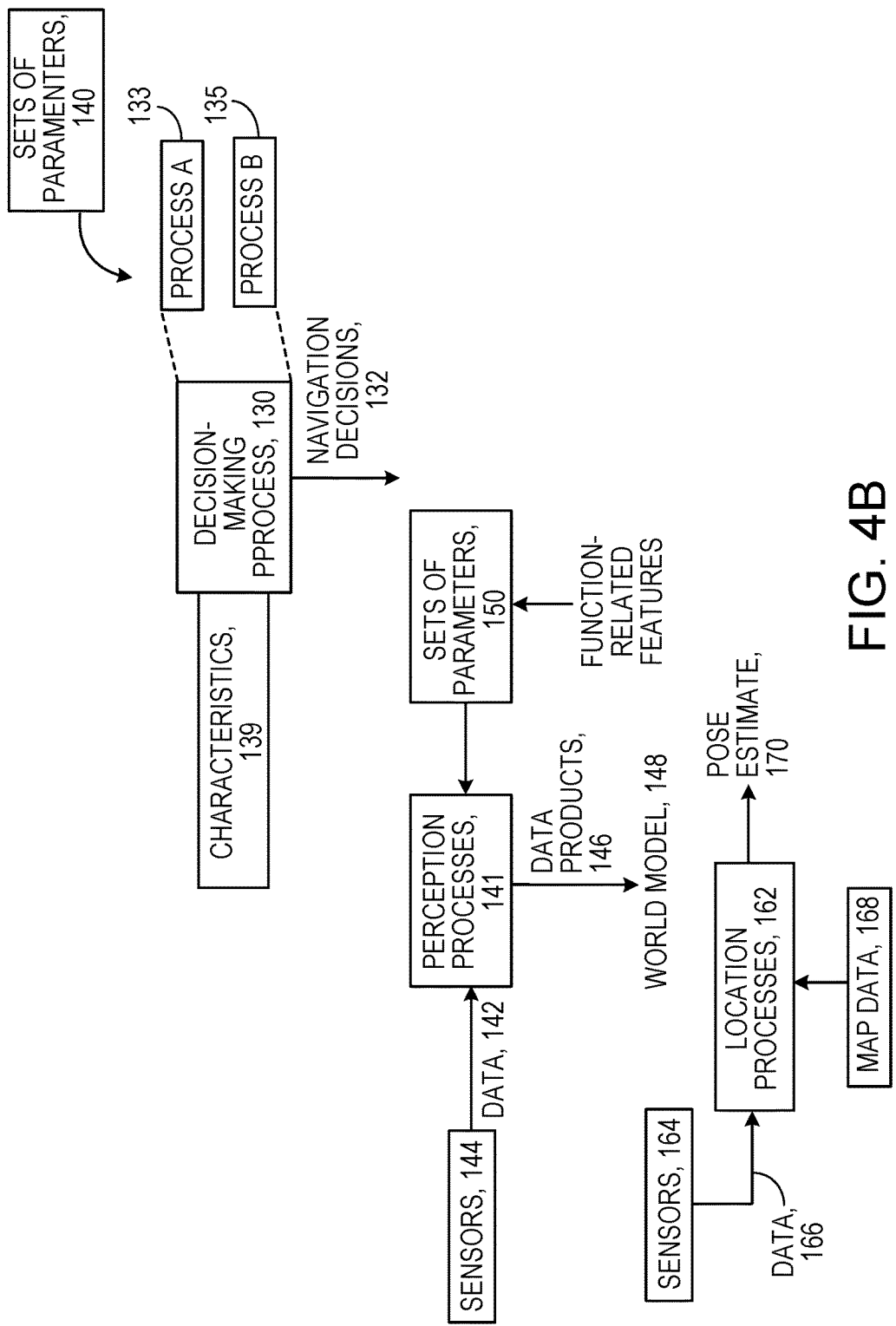

Referring to FIG. 4, as an example, consider a self-driving vehicle (we sometimes use the terms "autonomous" and "self-driving" synonymously) that uses a particular software process 62 for motion planning. Vehicles capable of highly automated driving (e.g., autonomous vehicles) rely on a motion planning process, e.g., an algorithmic process, to automatically generate and execute a trajectory 64 through the environment toward a designated short-term goal. We use the term "trajectory" broadly to include, for example, any path from one place to another. To distinguish the trajectory 64 that is generated by the motion planning process from the route 66 that is generated by a route planning process, we note that trajectories are paths through the vehicle's immediate surroundings (e.g., with distance scales typically on the order of several meters to several hundred meters). A trajectory is specifically designed to be free of collisions with obstacles and often to have desirable characteristics related to path length, ride quality, required travel time, lack of violation of rules of the road, adherence to driving practices, or other factors and combinations of them. We sometimes use the terms "trajectory" and "path" interchangeably and sometimes refer to either of them as the "output" or "result" of the motion planning process. We note that various motion planning processes may exhibit different properties, including the frequency at which they can generate trajectories, the types of trajectories that they generate (including the density and complexity of the trajectories), and other factors.

Figure 6:
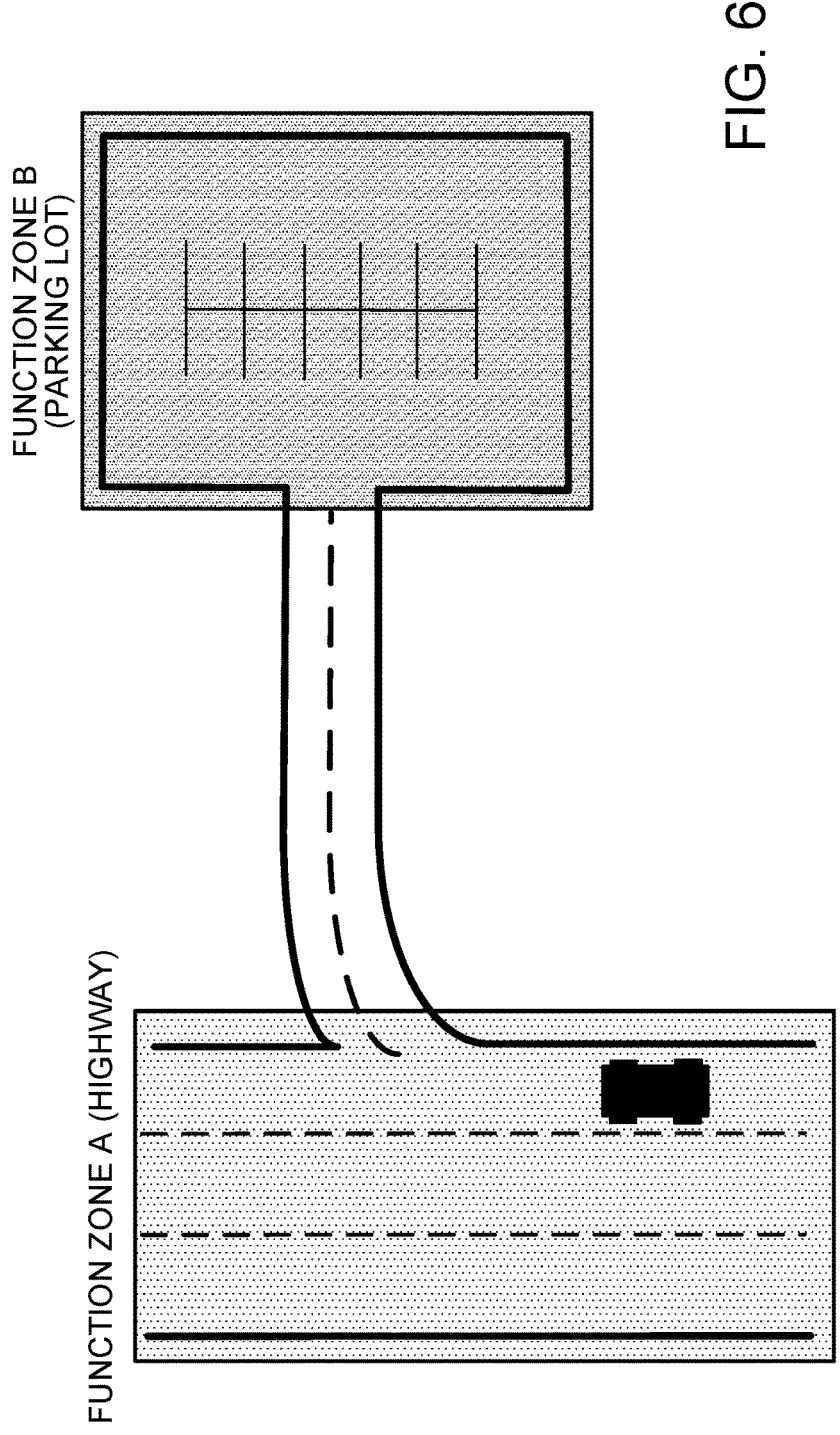
Figure 7:
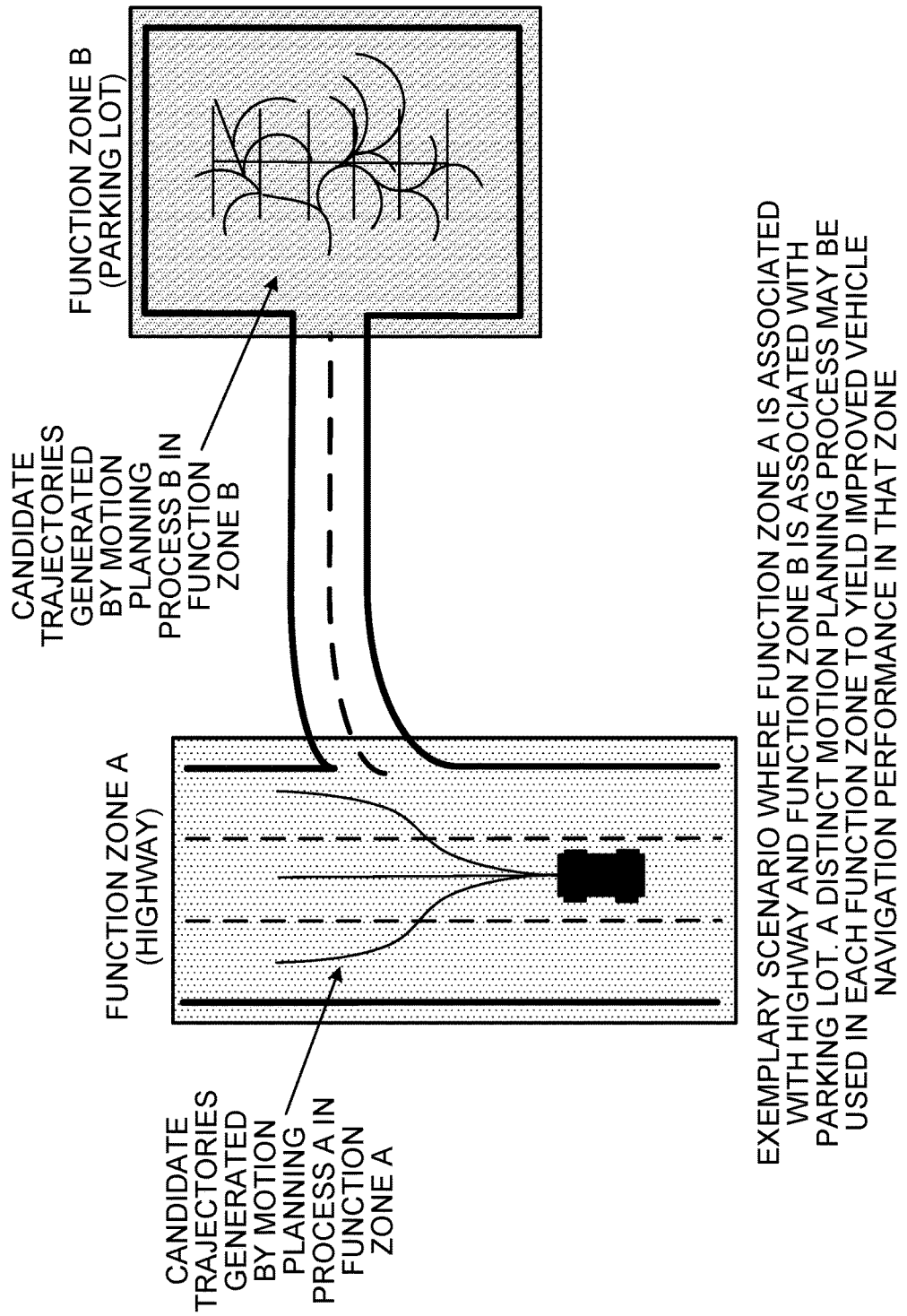

As illustrated also in FIG. 6, consider an autonomous vehicle that uses a first motion planning software process 68 to enable navigation in crowded parking lots, and a second motion planning software process 70 to enable navigation on fast-moving freeways. The function-related information in the database can include a defined function-related feature associated with a geographic region of a parking lot and another defined function-related feature associated with a geographic region of a freeway. Then a self-driving car's ability to maintain an accurate estimate 74 of its own geographic location can be exploited by a feature-responsive software process 72 to continually identify any function-related information in the database that identifies a feature that matches a vehicle's current location. Once identified, the process 72 can select an appropriate motion planning software process, e.g., process 68 or process 70, or can otherwise modify a structure or performance of motion planning software processes on the vehicle automatically to cause the vehicle to proceed in a way that is appropriate for, in this example, either the parking lot function-related feature or the freeway function-related feature.

Function-related features may include a wide variety of different types of features of the environment of the vehicle.

For example, function-related features may be associated with physical roadway structures such as pedestrian crosswalks, intersection zones, railway crossing areas; freeways, turnpikes, highways, and other high-speed travel zones; secondary roads; parking lots; pedestrian zones that allow vehicular traffic; designated school zones; driveways, road shoulders or breakdown lanes; toll booths; gas stations or electric vehicle charging stations; taxi stands; car rental lots; airport arrival/departure levels; construction zones; areas with known vehicle-to-vehicle (v2v) or vehicle-to-infrastructure (v2i) capability; designated autonomous vehicle travel areas (e.g., specified travel lanes or road regions that only admit passage to autonomous vehicles); drive-throughs (e.g., for bank automated tellers, or fast food), or car washes, to name a few.

Function-related features may be associated with drivable areas such as portions of a road, parking lot, unpaved drivable area, or other drivable surface.

In addition to identifying or defining different types of function-related features to be represented by function-related information in the database, sub-features 54 (FIG. 3) of function-related features can also be identified or defined. For example, if secondary roads are a type of function-related feature, different lane markings (e.g., painted lane lines and Botts dots) of secondary roads can be identified as such sub-features in the database.

Function-related sub-features can be identified or defined based on geographic proximity to objects or road features of interest. For example, a section of a secondary road that is near to a stop or yield sign can be identified in the database as a sub-feature having proximity to objects or road features of interest.

Different portions of function-related features that lie in different geographic places, and therefore are associated with different driving rules or customs, can be identified in the database as being in the corresponding geographic places. For example, an instance of a type "geographic region" can be defined as a 2D polygon describing the geographic extent of the function-related feature, such as an ordered set of 2D coordinates, together with a unique map identifier for which the 2D coordinates are valid. An instance of a type "road feature" (such as a specific traffic sign or a set of traffic signs) could be defined by a set of 2D coordinates together with a unique map identifier for which 2D coordinates are valid.

The following are exemplary ways in which vehicle functions (e.g., software processes) of self-driving vehicles can be invoked or modified (that is, affected) based on function-related feature information.

Motion Planning Processes

As mentioned earlier and as also illustrated in FIG. 7, self-driving vehicles use software processes termed motion planning processes to generate candidate trajectories (e.g., time-parameterized paths) that the ego vehicle may follow through the environment during a configurable time horizon T. The generated candidate trajectories are stored in a memory unit 45 (FIG. 3) on the vehicle. Generation of such candidate trajectories can be accomplished by a variety of known techniques, including techniques relying on state lattices, graph search techniques, constrained or unconstrained optimization, or techniques utilizing randomized planning methods such as probabilistic road maps or rapidly-exploring random trees. Such motion planning methods typically consider the locations of obstacles relative to the vehicle when generating candidate trajectories, so that candidate trajectories that would result in collision with one or more obstacles are removed from consideration. The result of the computations done at each time step k in a motion planning process includes a desirable, or sometimes optimal, trajectory 64 from the position of the ego vehicle at time k to the position of the vehicle at time k+T.

Certain motion planning processes may exhibit performance characteristics 63 (FIG. 4) that vary depending on the operational environment, e.g., depending on function-related features of the environment. Therefore, as suggested earlier, it may be desirable to be able to associate particular motion planning processes (such as processes 68 and 70 shown in FIG. 4) with particular types of function-related features, so that when the ego vehicle enters or leaves or transitions between function-related features it changes its motion planning processes accordingly.

For example, a certain motion planning process (process A) may be able quickly to generate candidate trajectories that exhibit little path curvature and may therefore be well-suited to motion planning for driving at high speeds on highways, where due to high vehicle travel speeds it is impossible to safely follow high-curvature trajectories. Another motion planning process (process B) may require greater computational effort and therefore operate at a lower update rate than process A, but may be able to generate complex (e.g., involving high path curvature or multi-point turn) trajectories, and may therefore be well-suited to motion planning for driving at low-speeds in parking lots and driveways.

In other words, managing the most effective operation of a motion planning process may depend on responding to characteristics of function-related features that are to be traveled.

Therefore, based on known properties (performance characteristics) of motion planning process A and motion planning process B, it may be desirable to use process A for function-related features that are associated with highways, freeways, turnpikes, and other high-speed travel zones, and process B for function-related features associated with parking lots, driveways, pedestrian zones that allow vehicular traffic, and other low-speed travel zones that require complex maneuvering.

Parameter Settings for a Given Motion Planning Process

Motion planning processes of various types generally rely on user-selected parameter settings 71 (FIG. 4) that influence the performance characteristics and output of the motion planning process.

As a result, the output of a given motion planning process that uses given parameter settings may be better suited (and therefore result in improved performance, by some metric) to the properties of a particular function-related feature. Therefore, it may be desirable to associate different sets of parameters for a given motion planning process with corresponding different function-related features.

For example, a certain motion planning process based on a class of algorithms known as rapidly exploring random trees (RRT), employing a parameter set A, tends to bias the RRT algorithm tree growth along a pre-defined nominal route. Such an approach may exhibit better performance characteristics (e.g., faster identification of a path of motion whose quality exceeds some user-defined threshold) in driving scenarios that do not require complex maneuvering, compared to the same motion planning process employing parameter set B, which does not tend to bias the RRT algorithm tree growth toward any particular route.

In some cases, a certain motion planning process based on a class of algorithms known as state lattices, using a parameter set A, defines a coarsely-spaced lattice in both space and time and therefore enables only coarse vehicle maneuvers and can identify candidate motion trajectories extremely rapidly. Such an approach may exhibit better performance characteristics (e.g., faster identification of a motion path whose quality exceeds some user-defined threshold) in a range of high-speed driving scenarios compared to the same planning process using a parameter set B, which defines a finely-spaced lattice in both space and time and therefore enables precise maneuvering at the cost of additional computation time.

Therefore, based on known properties of a motion planning process that can employ parameter set A or parameter set B, it may be desirable to arrange for the use of parameter set A for function-related features that are associated with highways, freeways, turnpikes, and other high-speed travel zones and the parameter set B for function-related features associated with parking lots, driveways, pedestrian zones that allow vehicular traffic, and other low-speed travel zones that require complex maneuvering. In some implementations, the two different parameter sets may be employed by a single given motion planning process. In some cases, the two different parameter sets may be employed by two different motion planning processes or two separate instances of a single process.

Motion planning process parameter settings can also be adjusted to influence common vehicle operational settings such as the travel speed, nominal and maximum longitudinal and lateral acceleration and deceleration, and other settings.

Use of Motion Planning Process Prior Information

Figure 8:
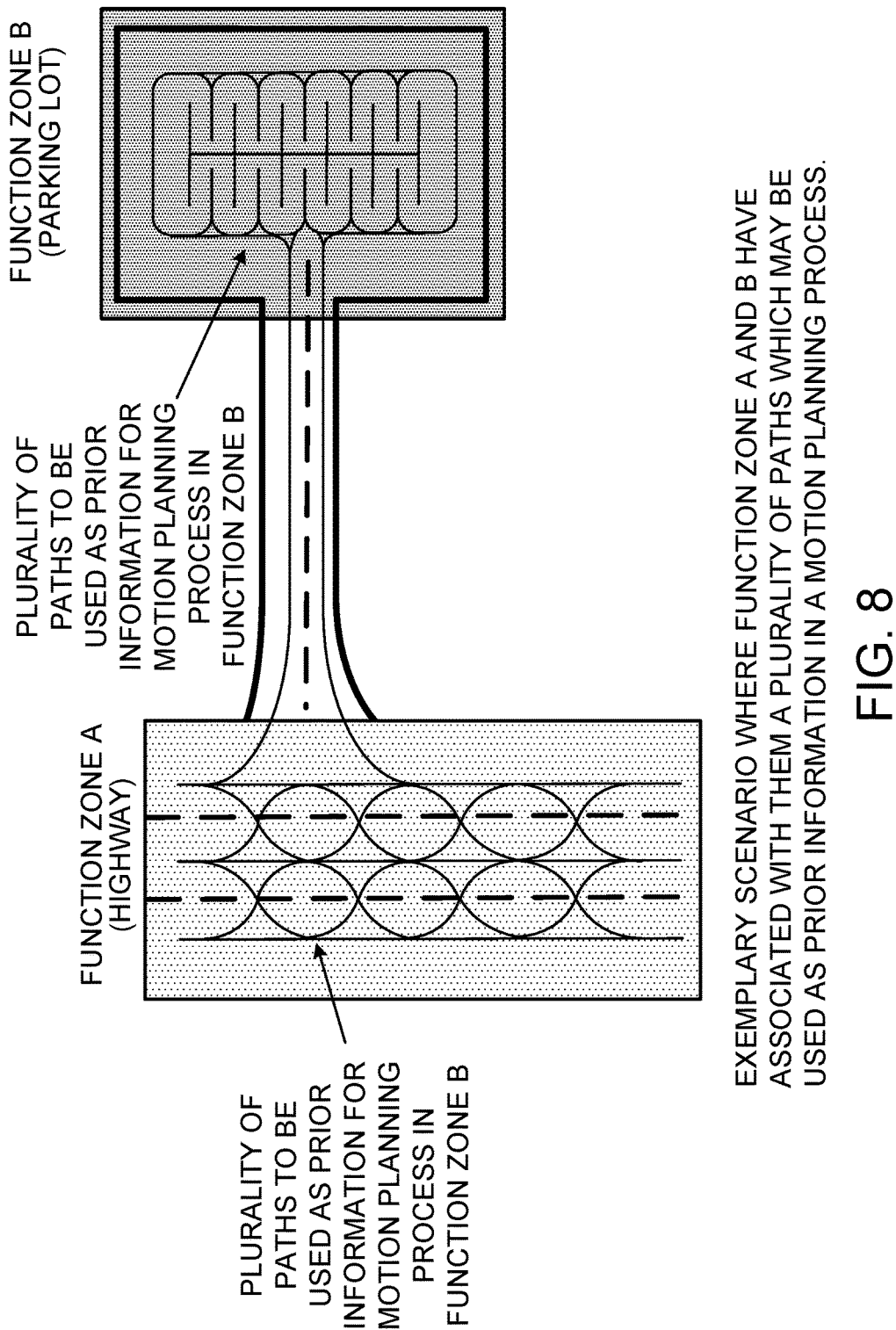

Motion planning processes of various types may take advantage of information of various types ("prior information") that is provided or available at initiation of the motion planning process or at a time prior to the planning of motion. Such prior information 79 (FIG. 4 and as also illustrated in FIG. 8) may be used to influence the performance characteristics or output or both of the motion planning processes. Using prior information may produce output from a given motion planning process that is better suited (and therefore results in improved performance, by some metric) to the properties of a particular type of function-related feature, compared to when the motion planning process does not make use of prior information. Therefore, it may be desirable to associate prior information with you different types of function-related features.

For example, given information about an ego vehicle's current position and goal position, and knowledge of properties of the road network e.g., function-related information 42, it may be possible to compute a nominal path from the current position to the goal position under the assumption that the route is free of obstacles. This nominal path can then be provided to the motion planning process as prior information, which may reduce the burden on the planning process of computing a path in certain scenarios. The nominal path can also take account of other information associated with the applicable function-related feature, such as the nominal travel speed, which influences the path curvature that can be followed by the vehicle to within a specified precision.

In some cases, given knowledge of the properties of the road network stored in the database, it may be possible to compute multiple nominal paths between a collection of start positions and goal positions on the road network. This collection of nominal paths can then be provided to the motion planning process as prior information, which may reduce the burden on the planning process of computing a motion plan in certain scenarios. This type of prior information may be especially useful in scenarios that require complex maneuvering, such as parking lots, because complex maneuvers can be challenging or time consuming to compute using a motion planning process, and the presentation of the nominal paths as prior information can reduce the computational burden.

Trajectory Tracking Processes

As also shown in FIG. 4, self-driving vehicles typically use software processes termed trajectory tracking (or path tracking) processes 102 to compute a set of input levels (e.g., effort levels of the steering, brake, and throttle) 104 to cause the vehicle to follow (we sometimes say to track) a trajectory or path 68 provided by a motion planning process 62 to within a specified precision. Such input levels can be generated by a variety of known techniques, including model predictive control (MPC), pure pursuit, fuzzy logic, neural networks (including convolutional neural networks and similar "deep learning" methods), and other techniques. The result of the computations done at each time step k in a trajectory tracking process includes a set of input levels that is intended to be applied at the current time step, and may also include a set of inputs that are intended to be applied from the current time to a future time k+T.

Certain trajectory tracking processes may exhibit performance characteristics that vary depending on the operational environment, for example, a function-related feature associated with the vehicle's location. Therefore, it may be desirable to associate different trajectory tracking processes with corresponding different function-related features, so that when the ego vehicle enters or leaves or transitions between function-related features it also transitions between execution of different trajectory tracking processes.

For example, a certain trajectory tracking process (process A) 105 based on a pure pursuit algorithm may quickly generate sets of input levels that are suitable for tracking paths that exhibit little path curvature, and may therefore be well-suited to driving at high speeds on highways for which it is impossible to safely follow high-curvature trajectories. In contrast, another trajectory tracking process (process B) 107 based on MPC may require greater computational effort and therefore operate at a lower update rate than process A, but may generate sets of input levels that are suitable for tracking complex (e.g., involving high path curvature or multi-point turn) trajectories, and may therefore be well-suited to driving at low-speeds in parking lots and driveways.

Therefore, based on known properties (e.g., performance characteristics 109) of trajectory tracking process A and trajectory tracking process B, it may be desirable to use process A to track paths in function-related features that are associated with highways, freeways, turnpikes, and other high-speed travel zones, and process B to track paths in function-related features associated with parking lots, driveways, pedestrian zones that allow vehicular traffic, and other low-speed travel zones that require complex maneuvering.

Adjustment of Trajectory Tracking Process Parameter Settings

Trajectory tracking processes of various types generally rely on user-selected parameter settings 112 that influence the performance characteristics and input levels that are the output of a trajectory tracking process. As a result, the output from a given trajectory tracking process that uses given parameter settings may be better suited (and therefore yield better performance, by some metric) to the properties of a particular type of function-related feature. Therefore, it may be desirable to associate different sets of parameters for a single trajectory tracking process with different types of function-related features.

For example, a certain trajectory tracking process that is based on a pure pursuit algorithm and uses a parameter set A, which includes a large "look ahead distance," may track trajectories more accurately in driving scenarios that do not require high curvature maneuvering, compared to the same trajectory tracking process using parameter set B, which includes a small look ahead distance, and results in accurate tracking of high curvature trajectories.

In some cases, a certain trajectory tracking process based on a class of algorithms known as MPC, and using a parameter set A, may define a cost function that weakly penalizes deviation from the trajectory provided by the motion planning process. This approach may produce coarse maneuvering, though also may generate steering inputs that have relatively small rate of change of amplitude and are comfortable to a passenger. By contrast, the same trajectory tracking process using parameter set B, which defines a cost function that heavily penalizes deviation from the trajectory provided by the motion planning process and therefore results in precise maneuvering, may yield steering inputs that have relatively large rate of change of amplitude and are less comfortable to a passenger.

Therefore, based on known properties of the trajectory tracking process when using different parameter sets (such as parameter set A or parameter set B), it may be desirable to have the process use a parameter set A for paths for function-related features that are associated with highways, freeways, turnpikes, and other high-speed travel zones, and to use a parameter set B for paths for function-related features associated with parking lots, driveways, pedestrian zones that allow vehicular traffic, and other low-speed travel zones that require complex maneuvering.

Actuator Control Processes

As also shown in FIG. 4, self-driving vehicles use software processes 120 termed actuator control processes to compute sets of actuator inputs 122 (e.g., electronic commands to actuators that modulate the effort exerted by the steering, brake, and throttle) to cause each actuator to attain the input level provided by the trajectory tracking process. Such actuator input sets can be generated by a variety of known techniques, including MPC, the family of proportional-integral-derivative control techniques, neural networks (including convolutional neural networks and similar "deep learning" methods), and other techniques and combinations of them. The result of the computations done at each time step k in an actuator control process includes a set of actuator inputs that is intended to be applied at the current time step, and may also include a set of actuator inputs that are intended to be applied from the current time to a future time k+T.

Certain actuator control processes may exhibit performance characteristics 121 that vary depending on the vehicle operational conditions and the environment conditions. Therefore, it may be desirable to associate different actuator control processes with corresponding different function-related features. Then ego vehicle transitions between function-related features can cause transitions between executions of different corresponding actuator control processes. Changes in vehicle operational conditions may include, for example, changes in vehicle speed, changes in engine throttle level, changes in selected transmission gear, and others. Changes in the environment conditions may include, for example, road surface friction levels, road pitch and roll, road roughness levels, whether or not it is raining or snowing or has recently rained or snowed, whether or not there is slush or puddles present on the road, and others.

For example, a certain throttle actuator control process (process A) 123 may yield accurate tracking of a desired throttle input level when the engine RPM level is relatively high and may therefore be well-suited to scenarios involving driving at high speeds on highways. Another throttle actuator control process (process B) 125 may yield accurate tracking of desired throttle input levels when the engine RPM level is relatively low and may therefore be well-suited to scenarios involving tracking complex (e.g., involving high path curvature or multi-point turn) trajectories, such as driving at low-speeds in parking lots and driveways.

In some cases, a certain steering actuator control process (process A) may yield accurate tracking of a desired steering input level when the vehicle speed level is relatively high and the wheel "scrubbing" torque that resists turning is thus relatively low and may therefore be well-suited to scenarios involving driving at high speeds on highways. Another steering actuator control process (process B) may yield accurate tracking of desired steering input levels when the vehicle speed is relatively low and the wheel "scrubbing" torque that resists turning is thus relatively high, and may therefore be well-suited to scenarios involving tracking complex (e.g., involving high path curvature or multi-point turn) trajectories, such as driving at low-speeds in parking lots and driveways.

Therefore, in both examples and other examples, based on known properties of actuator control process A and actuator control process B, it may be desirable to use process A for function-related features that are associated with highways, freeways, turnpikes, and other high-speed travel zones and process B for function-related features associated with parking lots, driveways, pedestrian zones that allow vehicular traffic, and other low-speed travel zones that require complex maneuvering.

Actuator Control Process Parameter Settings

As also shown in FIG. 4, actuator control processes of various types generally rely on user-selected parameter settings 124 that influence the performance characteristics and output of the actuator control process. As a result, the output from a given actuator control process that uses given parameter settings may be better suited (and therefore yield better performance, by some metric) to the properties of a particular type of function-related feature. Therefore, it may be desirable to associate different sets of parameters for a given actuator control process with different corresponding types of function-related features.

For example, a certain throttle actuator control process based on a proportional-derivative algorithm, using a parameter set A, may track a desired throttle input level more accurately when the engine RPM level is relatively high and may therefore be well-suited to scenarios involving driving at high speeds on highways. The same throttle actuator control process based on the proportional-derivative algorithm, and using a parameter set B, may track the throttle input levels more accurately when the engine RPM level is relatively low and may therefore be well-suited to scenarios involving tracking complex (e.g., involving high path curvature or multi-point turn) trajectories, such as driving at low-speeds in parking lots and driveways.

In some cases, a certain steering actuator control process, using a parameter set A having relatively low proportional gain, may track a steering input level more accurately when the vehicle speed level is relatively high and the wheel "scrubbing" torque that resists turning is thus relatively low and may therefore be well-suited to scenarios involving driving at high speeds on highways. The same steering actuator control process using a parameter set B with relatively high proportional gain may track steering input levels more accurately when the vehicle speed is relatively low and the wheel "scrubbing" torque that resists turning is thus relatively high and may therefore be well-suited to scenarios involving tracking complex (i.e. involving high path curvature, multi-point turns) trajectories, such as driving at low-speeds in parking lots and driveways.

Therefore, based on known properties of the actuator control process employing parameter set A and employing parameter set B, it may be desirable to apply parameter set A to function-related features that are associated with highways, freeways, turnpikes, and other high-speed travel zones, and parameter set B to function-related features associated with parking lots, driveways, pedestrian zones that allow vehicular traffic, and other low-speed travel zones that require complex maneuvering.

Actuator Control Process Prior Information

Actuator control processes of various types may take advantage of prior information 128 typically in the form of a model that is provided at initiation of the process and that may influence the performance characteristics and output of the actuator control process. This may result in the output from a given actuator control process being better suited (and therefore producing better performance, by some metric) to the properties of a particular function-related feature when the actuator control process makes use of prior information, compared to when the actuator control process does not make use of prior information. Therefore, it may be desirable to associate prior information contained in a model with corresponding different function-related features.

For example, given information about the ego vehicle's current position and knowledge of the properties of the road network available in the database, it is generally possible to generate a nominal speed associated with travel along a particular road segment. Based on this it may be possible to infer whether or not vehicle motion (including both longitudinal motion and yaw (e.g., steering-induced motion) arising from given actuator inputs can be accurately predicted through the use of models of varying complexity. Examples of models of varying complexity include kinematic models and dynamic models of increasing order that consider effects such as longitudinal wheel slip, vehicle rollover, and lateral skidding.

Control processes that exploit prior information contained in a model can generally be referred to as "model-based control processes." Model based control processes generally work better when the specific model used in the control process accurately represents the physical relationship described by the model. Therefore it may be desirable to associate with a particular type of function-related feature a prior model that is expected to accurately represent the physical relationship described by the model during operation of the vehicle in the particular function-related feature.

Different Decision Making Processes

As also shown in FIG. 4, self-driving vehicles use software processes termed decision making processes 130 to compute one or a sequence of navigation decisions 132. Such navigation decisions can generally be associated with desired high-level or longer-range objectives (defined by a user or an automated process or a combination of the two), such as goal positions, trajectories, or waypoints, all of which may have associated temporal components (for example, the objective to get to Joe's tavern by 6 PM). Examples of navigation decisions include the decision to change travel lanes on a highway, the choice of travel speed on a secondary road, the determination of the instant at which motion should be initiated at a crowded four-way stop intersection, the determination of the instant at which a complex merging maneuver at a roundabout should be initiated, and others. Such navigation decisions can be generated by a variety of known techniques, including finite state machines, decision trees, fuzzy logic, formal logic, and other techniques. The result of the computations done at each time step k in a decision making process may include a set of desired goal positions, trajectories, or waypoints, all of which may have associated temporal components.

Certain decision making processes may exhibit performance characteristics that vary depending on the operational environment (e.g., function-related features). Therefore, it may be desirable to associate different decision making processes with different types of function-related features, so that when the ego vehicle transitions between function-related features it makes a corresponding transition between execution of different decision making processes.

For example, a certain decision making process (process A) 133 based on finite state machines may rapidly calculate a desirable navigation decision in scenarios where the decision-space of possible decisions is small and may therefore be well-suited to scenarios involving driving on highways, where the decision space relates primarily to determination of the vehicle's appropriate travel speed and lane. Another decision making process (process B) based on formal logic may calculate a desirable navigation decision in scenarios where the space of possible decisions is large and may therefore be well-suited to scenarios involving driving in crowded urban centers. For driving in crowded urban centers, the decision making process must adhere to a rule set governing not only vehicles but pedestrians and cyclists, and the vehicle must negotiate intersections. The corresponding decision space relates not only to the vehicle's appropriate travel speed and lane but also to the temporal sequencing of actions in light of complex actions of other road users.

Therefore, based on known properties of decision making process A and decision making process B, it may be desirable to use process A for types of function-related features that are associated with highways, freeways, turnpikes, and other high-speed travel zones, and process B for types of function-related features associated with parking lots, driveways, pedestrian zones that allow vehicular traffic, and other low-speed travel zones that require complex maneuvering.

Decision Making Process Parameter Settings

Decision making processes of various types generally rely on user-selected parameter settings 140 that influence the performance characteristics and output of the decision making process. This may result in output from a given decision making process that uses given parameter settings being better suited (and therefore producing better performance, by some metric) to the properties of a particular type of function-related feature. Therefore, it may be desirable to associate different sets of parameters for a given decision making process with different function-related features.

For example, a certain decision making process based on finite state machines, using a parameter set A that restricts the breadth of allowable decisions, may be well-suited to scenarios involving driving at high speeds on highways where the space of possible decisions is small and relates primarily to determination of the vehicle's appropriate travel speed and lane. The same decision making process using a parameter set B that expands the breadth of allowable decisions may be well-suited to driving in crowded urban centers. In urban centers, the space of possible decisions is large, and the decision making process must adhere to a rule set governing not only vehicles but pedestrians and cyclists. The vehicle also must negotiate intersections corresponding to a decision space that relates not only to the vehicle's appropriate travel speed and lane but also the temporal sequencing of actions in light of complex actions of other road users.

Therefore, based on known properties (characteristics 139) of the decision making process using parameter set A and using parameter set B, it may be desirable to use the process employing parameter set A for types of function-related features that are associated with highways, freeways, turnpikes, and other high-speed travel zones, and the process employing parameter set B for types of function-related features associated with parking lots, driveways, pedestrian zones that allow vehicular traffic, and other low-speed travel zones that require complex maneuvering.

Parameter sets may also adjust the level of assertiveness of the vehicle, define the rules of the road or cultural norms in different areas, including but not limited to time to wait at an intersection and whether overtaking on the right is permissible by local law.

Adjustment of Perception Process Parameter Settings

Figure 9:
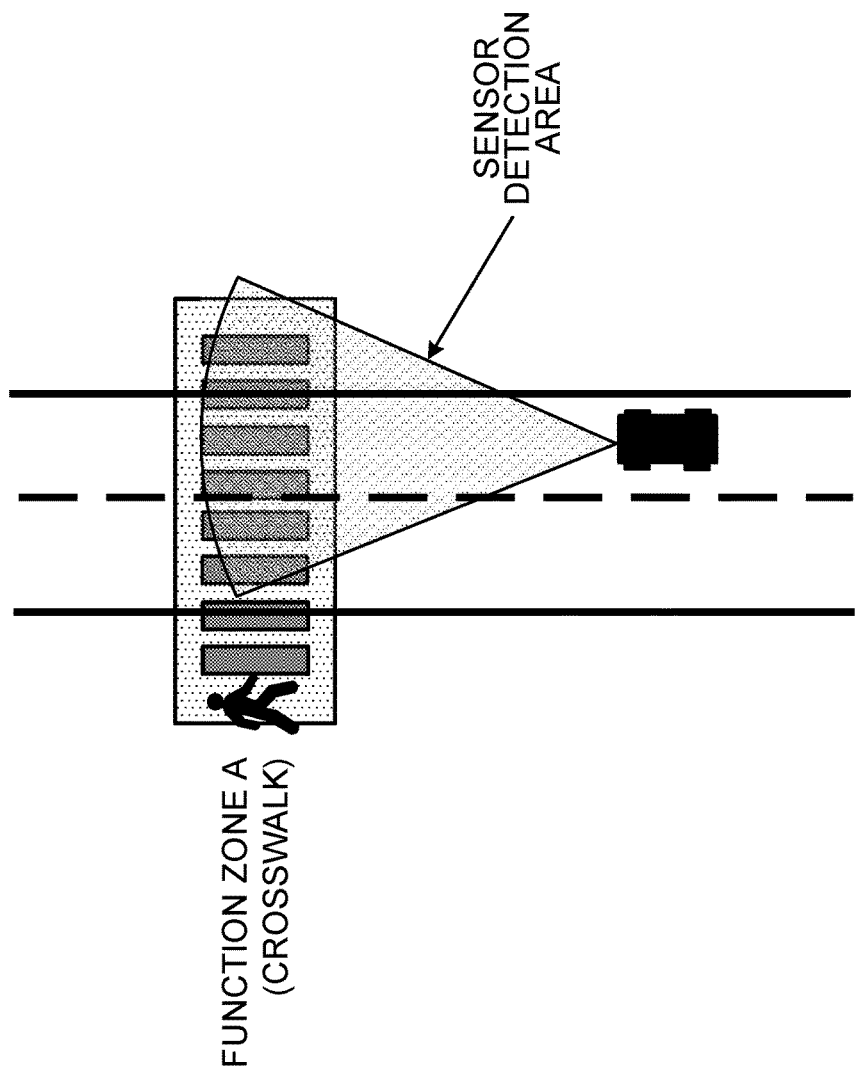

As also shown in FIG. 4 and as also illustrated in FIG. 9, self-driving vehicles use software processes termed perception processes 141 to analyze data 142 collected from one or more sensors 144 (e.g., LIDAR, RADAR, ultrasonic, video, inertial measurement sensors, wheel odometry sensors, etc.) to compute various data products 146 with an aim of generating a "world model" 148 that describes information (e.g., current and estimated future position and velocity, type/class of object, etc.) that is relevant to vehicle driving. Examples of typical data products include identified vehicles, pedestrians, cyclists, static objects, lane markers, railroad crossings, signs (including both sign position and content), traffic lights (including traffic light type and state), and others, and combinations of them. These data products may be computed by analysis of data collected by a single sensor or by analysis of data collected by multiple sensors in a sensor fusion (or data fusion) process. The result of the computations done at each time step k in a perception process may include a world model at the current time, and an estimated evolution of the world model from the current time to a future time k+T.

Perception processes of various types generally rely on user-selected parameter settings 150 that influence the performance characteristics and output 146 of the perception process. As a result, output from a given perception process that uses given parameter settings may be better suited (and therefore produce better performance, by some metric) to the properties of a particular function-related feature. Therefore, it may be desirable to associate different sets of parameters for a given perception process with different function-related features.

For example, a certain object detection perception process using a parameter set A may discount the importance of RADAR (or another sensor type) in a sensor fusion perception process in a geographic area where certain road infrastructure affects the quality of sensor readings, such as via the induction of invalid measurements.

In some cases, a certain sensor fusion perception process employing a parameter set A that heavily weights long-range RADAR data for the purpose of detecting vehicles at long range, at the expense of precise estimation of vehicle position, may be well-suited to scenarios involving driving on highways where long-range detection of vehicles is required in order to give sufficient reaction time to respond to emergency situations. In some cases, the same sensor fusion perception process employing a parameter set B that heavily weights short-range LIDAR data for the purpose of precisely detecting vehicle position at short range, at the expense of accurate vehicle detection at longer range, may be well-suited to driving in crowded urban centers, where precise, short-range detection of vehicles is required.

In some instances, a perception process using a tunable RADAR sensor employing a parameter set A that adjusts the RADAR sensor to collect data at long range with a narrow field of view for the purpose of detecting vehicles at long range, at the expense of detecting vehicles in the broader surroundings, may be well-suited to scenarios involving driving on highways where long-range detection of vehicles is required in order to give sufficient reaction time to respond to emergency situations. In contrast, the same perception process using a tunable RADAR sensor employing a parameter set B that adjusts the RADAR sensor to collect data at short range with a wide field of view for the purpose of detecting vehicles at short range, though in a broader surrounding region, may be well-suited to driving in crowded urban centers, where precise, short-range detection of vehicles is required.

Therefore, in various examples, based on known properties of the perception process when it is using parameter set A and when it is using parameter set B, it may be desirable to use the process with parameter set A for function-related features that are associated with highways, freeways, turnpikes, and other high-speed travel zones, and to use the process with parameter set B for function-related features associated with parking lots, driveways, pedestrian zones that allow vehicular traffic, and other low-speed travel zones that require complex maneuvering.

In some implementations, the output of a certain perception process that enables detection of vehicles and pedestrians may be ignored completely when the detected vehicles and pedestrians lie outside a function-related feature that describes the drivable road surface and a nearby buffer zone, because such vehicles and pedestrians (e.g., vehicles parked in a distant parking lot, or pedestrians walking on a sidewalk that is far from the road) are considered to be irrelevant to the driving task.

Figure 5:
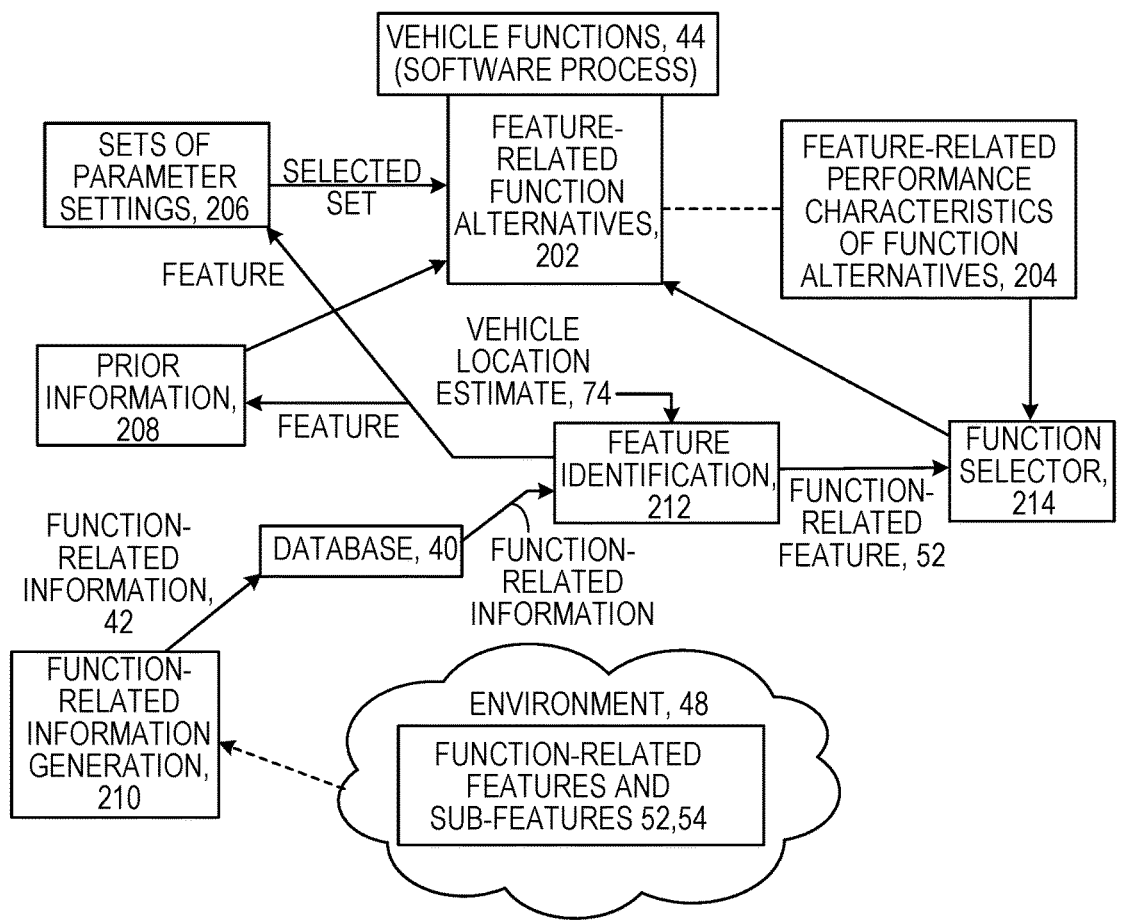

Therefore, as shown in FIG. 5, in general, vehicle functions 42 can include software processes and any other driving or operating or other functions of a vehicle. Each of the vehicle functions 42 can have feature-related function alternatives 202. These could be represented, for example, by different software processes, different instances of a single process, or different modes of operation of a process, or combinations of them. The feature-related function alternatives have characteristics 204 related to their performance. Different characteristics of a given function alternatives may suggest that it is especially useful with respect to certain function-related features or types of function-related features. Based on a location estimate 74 for a vehicle at a given time, and based on function-related information available in database 30, a function identification process 212 can continually be identifying function-related features 52 in the environment 48 that are relevant to the vehicle's operation. Several different processes can make use of the information about the function-related features provided by the feature identification process.

For example, a function selector 212 can use information about feature-related performance characteristics 204 of function alternatives together with the identified feature information to select among the feature-related function alternatives or to alter or affect in a wide variety of other ways the operation of a vehicle function.

Also, for example, a prior information process 208 can use the information about the identified features in generating, updating, or modifying prior information and then providing it to the currently active vehicle function.

Also, for example, a process that manages sets of parameter settings 206 and provides selected sets to the feature-related function alternatives can operate in response to the identified function-related features.

The function-related information 42 in the database 30 can be generated by a function-related information generation process to 10, which can be manual, semi-automated, automated, or a combination of them, based on known, observed, or identified function-related features and sub features 52, 54 in the environment 48.

Different Localization Processes

As also shown in FIG. 4, self-driving vehicles use software processes termed localization processes 162 to analyze data 166 collected from one or more sensors 164 (e.g., LIDAR, RADAR, ultrasonic, video, inertial measurement sensors, GPS, wheel odometry sensors, etc.) or the perception processes 141 to compare various data inputs 166 against a database of previously recorded data (commonly processed into a "map" stored on-board the vehicle) 168 with an aim of generating a precise pose estimate 170 of the vehicle at the current time.

Example data inputs include lane marker information, road curbs, raw or processed sensor readings from RADAR and LIDAR, the most recent GPS pose, and relative vehicle motion estimates from odometry and inertial measurement sensors. These data inputs are commonly combined in the localization process into a probabilistic state estimate based on a filtering process (for example, a Kalman or particle filter process) to compute the pose of the vehicle with respect to the map at the current time.

Different localization processes may utilize different data inputs. For example, GPS precision may be poor in urban regions due to well-known multipath and other errors, lack of satellite availability, for example. Similarly, lane marker information may be unavailable in certain regions.

Therefore, based on known properties of localization process A and localization process B, it may be desirable to use process A for types of function-related features that are associated with highways, and process B for types of function-related features associated with urban settings.

Sensor Data Recording On-Board the Vehicle

Different geographic regions may impose restrictions on what data may be collected by a self-driving vehicle. For example, privacy laws may differ among states or countries and disallow the collection of video data on-board the vehicle.

Therefore, it may be desirable to disallow or restrict the duration of sensor data recording or storage on- and off the vehicle for types of function-related features that are associated with different areas including, but not limited to, countries, states, and communities, based on prior knowledge of the respective local laws or policies.

Transitions Between Function-Related Features

A given geographic region may have associated with it two or more function-related features. In this scenario, if each function-related feature would cause a modification of (affect) the structure or performance of software processes on the vehicle in a contradictory or conflicting manner, an arbitration method can be employed to prioritize one function-related feature above others for purposes of influencing a process, or run multiple processes concurrently and choose, switch between, or otherwise merge the outputs of the multiple processes.

In practice, when the ego-vehicle engages in transitions between geographic regions associated with different function-related features, care must be taken to ensure that the transition between different software processes (or different operating modes of a given software process) associated with the respective different function-related features does not result in abrupt changes in vehicle behavior. Such abrupt changes may cause vehicle motion that is uncomfortable or unsafe to a passenger or unusual to an outside observer. A variety of methods may be pursued to ensure that transitions between different software processes (or different modes of operation of a given software process) are accomplished in such a manner that vehicle operation remains safe, stable, and robust, including one or more of the following exemplary methods:

1. Comparing the outputs of the software processes (or modes of operation of a software process) associated with the respective function-related features and ensuring smooth transitioning between software process outputs through the use of a filtering method (e.g., averaging filter, low-pass filter, exponential moving average filter) on the value of the outputs;

2. Allowing a transition between outputs of the software processes associated with the respective function-related features and ensuring smooth transitioning between software process outputs by only allowing the transition when the difference between the outputs is smaller than a predefined threshold;

3. Ensuring a smooth transitioning between software process outputs by smoothly transitioning between the software process parameter settings associated with the respective function-related features;

4. Allowing the transition between outputs of the software processes associated with the respective function-related features, but ensuring that the outputs do not switch back and forth at high frequency (potentially due to the presence of high frequency noise in the vehicle's location estimate) by applying a hysteresis function.

Information about function-related features can be used during operation of either or both of a physical vehicle or of a simulation process, in which a model (at a chosen level of fidelity) of the vehicle and environment are analyzed to study or predict vehicle operational performance characteristics in a range of user-defined scenarios. Such a simulation process could be executed on the vehicle during operation (to yield a model-based predictive capability of future operational performance) or on computing resources located in an office or in the cloud.

In certain scenarios a vehicle may be controlled or managed in certain or all functions by a remote operator (termed a "teleoperator"). We use the term teleoperator broadly to include any person or software process that is located away from the vehicle and receives over a wireless communication link sufficient information (e.g., video feedback captured by a forward-facing video camera) to provide actuator input levels, navigation decisions, or other vehicle operation commands. In scenarios where the vehicle is under teleoperator control, the vehicle may be considered in effect to lie within a function-related feature that may result in the affecting of one or more of the processes described above.

Generation of Function-Related Information

As discussed earlier, function-related information 42 may be included in a road network information database or similar database and can contain information, such as geographically-dependent information, that can be used to modify (affect) the operation or performance of a vehicle such as an autonomous vehicle such as to affect the operation of software processes associated with such operational performance. The function-related information can be generated in several ways, including through the use of manual, semi-automated, or automated processes, as described below. Function-related information generated by any of these processes (or any combination of them) can be stored in a database in memory units located on automated vehicles or located on a cloud server and accessed by wireless communication by numerous automated vehicles that have access to that communication network.

Manual Generation of Function-Related Information

Function-related information can be generated by a software process termed a manual map labeling process. Such a process requires a human user to identify or define different function-related features and associate geometric regions and the road network information related to these regions with different function-related features, using a variety of possible input devices and user interfaces.

A manual map labeling process might present to a user a visual representation of a road network on a display screen, including an aerial view of the road network overlaid with a graphical representation of the connectivity of the travel lanes present in the road network. The user could then "paint," or bound with geometric shapes of varying size, function-related features associated with highways, parking lots, driveways, toll booths, or other road features are geographic regions.

A manual map labeling process can be run on a computer processor that is not located on a vehicle or it may be run on a computer processor that is located on a vehicle or both. In applications in which the manual map labeling process is run on a computer processor that is located on an autonomous vehicle, a vehicle passenger or other human user could manually identify the presence of and the boundaries of one or more different physical roadway structures or geographic regions through a user interface. A function-related feature associated with the distinct physical roadway structure or geographic region could then be generated by the manual map labeling process.

As an example of such a process, when an automated vehicle enters a parking lot, a vehicle passenger could employ an in-vehicle user interface to indicate that the vehicle has entered a parking lot. Alternatively, a vehicle-to-infrastructure communication process could send a message to the vehicle to indicate that the vehicle has entered a parking lot. Function-related information for a function-related feature of the type associated with parking lots then can be generated by the manual map labeling process, and various software processes could then be automatically adjusted to optimize vehicle performance for operation in parking lots.

Semi-Automated Generation of Function-Related Information

Function-related features can be defined using a software process termed a semi-automated map labeling process. This process can use one or more supervised or unsupervised classification algorithms to automatically identify distinct physical roadway structures based on analysis of characteristic visual, geometric, or other features associated with the structures, including features derived from observed traffic flow and from data collected by manually-driven vehicles or automated vehicles. Such classification algorithms include, for example, support vector machines, neural networks (including convolutional neural networks and similar "deep learning" methods), and others.

A human user then can be presented with the classified physical roadway structures and asked to accept, label, modify, or reject the classifications. If the human user accepts or modifies a classification, a function-related feature associated with the particular physical roadway structure is assigned to the geographic region or regions associated with the roadway structures. Such a method promises to increase efficiency in function-related feature definition, because part of the labeling process is performed rapidly and automatically by a machine.

A semi-automated map labeling process can be run on a computer processor that is not located on a vehicle, or it may be run on a computer processor that is located on a vehicle. In applications where the semi-automated map labeling process is run on a computer processor that is located on a vehicle, data collected by sensors located on board the vehicle are analyzed, potentially in concert with data stored on a memory located on the vehicle or in the cloud, to identify the presence of distinct physical roadway structures associated with distinct function-related features. A vehicle passenger or other human user is then presented with the classified physical roadway structures and asked to accept, label, modify, or reject the classifications.

As an example of such a process, data collected by a vision sensor mounted on the vehicle could be analyzed to detect geometric and color features associated with traffic cones, thereby indicating the likely presence of a construction zone. When such a construction zone is identified, a vehicle passenger or remote vehicle monitor could be asked to confirm that the nearby road contains a construction zone using a visual prompt on an in-vehicle display, an auditory prompt, or some other prompt. If the passenger or remote monitor answers affirmatively, function-related information for a function-related feature of the type associated with construction zones can be associated with the geographic region or regions associated with the detected cones by the semi-automated map labeling process, and various software processes could then be automatically adjusted to optimize vehicle performance for operation in construction zones.

Automated Generation of Function-Related Features

Function-related features can be defined using a software process termed an automated map labeling process. This process can use one or more supervised or unsupervised classification algorithms to automatically identify distinct physical roadway structures or geographic regions based on analysis of unique visual, geometric, or other features associated with the structures, including features derived from observed traffic flow and from data collected by manually-driven vehicles or automated vehicles. Such classification algorithms include, for example, support vector machines, neural networks (including convolutional neural networks and similar "deep learning" methods), and others. Function-related information for a function-related feature associated with the distinct physical roadway structure is then automatically assigned to the geographic region(s) associated with the roadway structures. Such a method promises to greatly increase efficiency in function-related feature definition, since all of the labeling process is performed rapidly by a machine, however care must be taken to ensure that the algorithms employed for automated identification are highly accurate, since erroneous classifications by the classification process could lead to erroneous function-related feature assignment.

An automated map labeling process can be run on a computer processor that is not located on a vehicle, or it may also be run on a computer processor that is located on a vehicle. In applications where the automated map labeling process is run on a computer processor that is located on a vehicle, data collected by sensors located on board the vehicle are analyzed, potentially in concert with data stored on a memory located on the vehicle or in the cloud, to identify the presence of distinct physical roadway structures associated with distinct function-related features. Function-related features are then automatically defined based on the geometric region(s) associated with these roadway structures.

As an example of such a process, data collected by a vision sensor mounted on the automated vehicle could be analyzed to detect color and texture features associated with unpaved roads. When an unpaved road is identified, a function-related feature associated with the unpaved road can be associated with the geographic region(s) associated with the unpaved road by the semi-automated map labeling process, and various software processes could then be automatically adjusted to optimize vehicle performance for operation on unpaved roads.

Other implementations are also within the scope of the following claims.

The invention claimed is:

1. A method comprising:
receiving, by one or more processors of a vehicle, information that identifies or defines a first function-related feature of a first environment of the vehicle;
generating, by the one or more processors, first function-related information that corresponds to the first function-related feature, the first function-related information comprising geographical information that corresponds to the first function-related feature;
associating the first function-related information with the first function-related feature in a database;
causing the vehicle to self-drive and self-navigate in the first environment in accordance with the first function-related feature;
while the vehicle is traveling in the first environment:
detecting, by the one or more processors, that the vehicle has entered or is about to enter a second environment that is different than the first environment;
receiving, by the one or more processors, second information that identifies or defines a second function-related feature of the second environment that is different than the first environment;

generating, by the one or more processors, second function-related information that corresponds to the second function-related feature, the second function-related information comprising geographical information that corresponds to the second function-related feature;

associating the second function-related information with the second function-related feature in the database; and causing the vehicle to self-drive and self-navigate in the second environment in accordance with the second function-related feature.

2. The method of claim 1 in which the information is received from a combination of an automated process and manual input.

3. The method of claim 1 in which the geographical information comprises a location or geographic region that corresponds to the first or second function-related feature.

4. The method of claim 1, wherein the second function-related information is an output of an actuator control process that calculates one or more actuator inputs that cause one or more actuators of the vehicle to be adjusted in accordance with a trajectory tracking process.

5. The method of claim 1, wherein the second function-related information is a location of the vehicle output by a localization process using a different localization technology than used by the vehicle while driving in the first environment.

6. The method of claim 1, wherein the second function-related information includes information that restricts collection of sensor data from one or more sensors of the vehicle.

7. The method of claim 1, wherein the second function-related information includes information that weights sensor data in a sensor fusion perception process differently than sensor data is weighted in the first environment.

8. The method of claim 1, wherein the second function-related information includes information that restricts navigation decisions based on at least one of a time available to make a navigation decision, a travel speed of the vehicle or a lane in which the vehicle is driving.

9. The method of claim 1, wherein causing the vehicle to self-drive and self-navigate comprises causing the vehicle to self-perform at least one of changing lanes when self-driving on a highway, choosing a travel speed on a secondary road, determine an instant of initiating motion at a crowded four-way stop or determine an instant of implementing a complex merging maneuver at a roundabout.

10. The method of claim 1, wherein associating the first function-related information with the first function-related feature comprises storing a location or geographic region of the first function-related feature in the database.

11. The method of claim 1, wherein the database comprises information about a road network, and wherein associating the first function-related information with the first function-related feature comprises labeling the road network with the first function-related feature based on the first-function related information.

12. The method of claim 1, wherein the second information is received by the one or more processors from the database based on a location of the vehicle.

13. The method of claim 1, wherein the first function-related information is automatically generated by the vehicle while the vehicle self-drives and self-navigates.

14. The method of claim 1, wherein the first function-related feature relates to a software function of the vehicle.

15. The method of claim 14, wherein the software function of the vehicle comprises one or more of a motion planning process, a trajectory tracking process, an actuator control process, a decision making process, or a localization process of the vehicle.

16. The method of claim 14 wherein causing the vehicle to self-drive and self-navigate in the first environment comprises altering the software function of the vehicle in accordance with the first function-related feature.

17. A self-driving vehicle comprising:
one or more sensors;
one or more actuators;
one or more processors;
memory configured to store instructions that when executed by the one or more processors, cause the one or more processors to perform operations comprising:
receiving information that identifies or defines a first function-related feature of a first environment;
generating first function-related information that corresponds to the first function-related feature, the first function-related information comprising geographical information that corresponds to the first function-related feature;
associating the first function-related information with the first function-related feature in a database;
causing, by input to the one or more actuators, the vehicle to self-drive and self-navigate in the first environment in accordance with the first function-related feature;
while the vehicle is traveling in the first environment:
detecting, by the one or more sensors or other data sources, that the vehicle has entered or is about to enter a second environment that is different than the first environment;
receiving second information that identifies or defines a second function-related feature of the second environment;
generating second function-related information that corresponds to the second function-related feature, the second function-related information comprising geographical information that corresponds to the second function-related feature;
associating the second function-related information with the second function-related feature in the database; and
causing, by input to the one or more actuators, the vehicle to self-drive and self-navigate in the second environment in accordance with the second function-related feature.

18. The vehicle of claim 17, wherein the second function-related information is a candidate trajectory generated by a motion planning process, the candidate trajectory having more or less maneuvering complexity or more or less curvature than a previous trajectory of the vehicle in the first environment.

19. The vehicle of claim 17, wherein the second function-related information is an output of a trajectory tracking process that tracks a trajectory of the vehicle in the second environment with more or less precision than a previous trajectory tracking process used by the vehicle while driving in the first environment.

20. The vehicle of claim 17, wherein the second function-related information is an output of an actuator control process that calculates one or more actuator inputs that cause one or more actuators of the vehicle to be adjusted in accordance with a trajectory tracking process.

21. The vehicle of claim 17, wherein the second function-related information is a location of the vehicle output by a localization process using a different localization technology than used by the vehicle while driving in the first environment.

22. The vehicle of claim 17, wherein the second function-related information includes information that restricts collection of sensor data from one or more sensors of the vehicle.

23. The vehicle of claim 17, wherein the second function-related information includes information that weights sensor data in a sensor fusion perception process differently than sensor data is weighted in the first environment.

24. The vehicle of claim 17, wherein the second function-related information includes information that restricts navigation decisions based on at least one of a time available to make a navigation decision, a travel speed of the vehicle or a lane in which the vehicle is driving.

25. The self-driving vehicle of claim 17, wherein causing the vehicle to self-drive and self-navigate comprises causing the vehicle to self-perform at least one of changing lanes when self-driving on a highway, choosing a travel speed on a secondary road, determine an instant of initiating motion at a crowded four-way stop or determine an instant of implementing a complex merging maneuver at a roundabout.

26. A non-transitory, computer-readable storage medium storing instructions that when executed by one or more processors, cause the one or more processors to perform operations comprising:
receiving information that identifies or defines a first function-related feature of a first environment;
generating first function-related information that corresponds to the first function-related feature, the first function-related information comprising geographical information that corresponds to the first function-related feature;
associating the first function-related information with the first function-related feature in a database;
causing a vehicle to self-drive and self-navigate in the first environment in accordance with the first function-related feature;
while the vehicle is traveling in the first environment:
detecting that the vehicle has entered or is about to enter a second environment that is different than the first operating environment;
receiving second information that identifies or defines a second function-related feature of the second environment;
generating second function-related information that corresponds to the second function-related feature, the second function-related information comprising geographical information that corresponds to the second function-related feature;
associating the second function-related information with the second function-related feature in the database; and
causing the vehicle to self-drive and self-navigate in the second environment in accordance with the second function-related feature.

27. The non-transitory, computer-readable storage medium of claim 26, wherein the second function-related information is a candidate trajectory generated by a motion planning process, the candidate trajectory having more or less maneuvering complexity or more or less curvature than a previous trajectory of the vehicle in the first environment.

28. The non-transitory, computer-readable medium of claim 26, wherein causing the vehicle to self-drive and self-navigate comprises causing the vehicle to self-perform at least one of changing lanes when self-driving on a highway, choosing a travel speed on a secondary road, determine an instant of initiating motion at a crowded four-way stop or determine an instant of implementing a complex merging maneuver at a roundabout.

* * * * *

UNITED STATES PATENT AND TRADEMARK OFFICE
CERTIFICATE OF CORRECTION

PATENT NO. : 10,829,116 B2
APPLICATION NO. : 15/200035
DATED : November 10, 2020
INVENTOR(S) : Karl Iagnemma, Baoxing Qin and Philipp Robbel Page 1 of 1

It is certified that error appears in the above-identified patent and that said Letters Patent is hereby corrected as shown below:

In the Claims

Column 22, Line 30, in Claim 28, after "computer-readable" insert -- storage --.

Signed and Sealed this
Nineteenth Day of January, 2021

Andrei Iancu
*Director of the United States Patent and Trademark Office*